US007185228B2

(12) United States Patent
Achiwa

(10) Patent No.: US 7,185,228 B2
(45) Date of Patent: Feb. 27, 2007

(54) METHOD FOR CONTROLLING INFORMATION PROCESSING SYSTEM AND INFORMATION PROCESSING SYSTEM

(75) Inventor: Kyosuke Achiwa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 536 days.

(21) Appl. No.: 10/637,776

(22) Filed: Aug. 7, 2003

(65) Prior Publication Data
US 2004/0148443 A1 Jul. 29, 2004

(30) Foreign Application Priority Data
Jan. 27, 2003 (JP) .............................. 2003-018058

(51) Int. Cl.
*G06F 11/00* (2006.01)
(52) U.S. Cl. ..................... 714/20; 714/4; 714/6; 714/7; 711/161; 711/162; 707/204
(58) Field of Classification Search ................ 714/4–8, 714/20, 42; 711/161, 162; 707/202, 204
See application file for complete search history.

(56) References Cited

U.S. PATENT DOCUMENTS

| 5,673,382 A * | 9/1997 | Cannon et al. ................ 714/6 |
| 5,742,792 A | 4/1998 | Yanai et al. |
| 6,052,797 A | 4/2000 | Ofek et al. |
| 6,088,697 A | 7/2000 | Crockett et al. |
| 6,163,856 A * | 12/2000 | Dion et al. ..................... 714/4 |
| 6,389,552 B1 * | 5/2002 | Hamilton et al. ............... 714/4 |
| 6,631,477 B1 * | 10/2003 | LeCrone et al. ................ 714/5 |
| 6,643,750 B2 | 11/2003 | Achiwa et al. |
| 6,658,590 B1 * | 12/2003 | Sicola et al. .................... 714/6 |
| 6,732,294 B2 * | 5/2004 | Mackrory et al. ............. 714/25 |
| 6,763,436 B2 * | 7/2004 | Gabber et al. .............. 711/146 |
| 6,928,513 B2 * | 8/2005 | Lubbers et al. ............. 711/114 |
| 2002/0133737 A1 * | 9/2002 | Novick ........................... 714/5 |
| 2003/0005235 A1 | 1/2003 | Young |
| 2003/0088592 A1 | 5/2003 | Innan |
| 2003/0177321 A1 | 9/2003 | Watanabe |

* cited by examiner

*Primary Examiner*—Robert W. Beausolel
*Assistant Examiner*—Emerson Puente
(74) *Attorney, Agent, or Firm*—Mattingly, Stanger, Malur & Brundidge, P.C.

(57) ABSTRACT

A storage system is composed of storage apparatuses each separately installed at three sites for the purpose of disaster recovery, wherein data stored in one of the storage apparatuses designated as a replication source is also managed in one of the other two storage apparatuses designated as a replication destination, such that in the event of a failover execution request from an information processing apparatus, data stored in the storage apparatus designated as the replication source is managed also in the storage apparatus of the other two storage apparatuses designated as a spare.

38 Claims, 18 Drawing Sheets

Failover state
Failover Initial Copy-in-progress State
Duplication failover-in-progress state

METHOD FOR CONTROLLING INFORMATION PROCESSING SYSTEM AND INFORMATION PROCESSING SYSTEM

BACKGROUND OF THE INVENTION

1. Field of the Invention

The present invention relates to a method for controlling an information processing system and to an information processing system.

2. Related Background Art

Disaster recovery in information processing systems is drawing attention. As a technology to realize disaster recovery, a technology for performing dual writing without the intervention of host computers among a plurality of storage apparatuses installed at physically remote sites (this technology is hereinafter called "remote copy") is known. In remote copy, a first storage apparatus and a second storage apparatus are each connected through a dedicated telephone line or public telephone line. The second storage apparatus, which is a replication destination storage apparatus, has a logical volume that corresponds to a replication source logical volume of the first storage apparatus, which is a replication source storage apparatus, and data in the logical volume of the first storage apparatus is controlled to be written to the logical volume of the second storage apparatus. Through such control, when there is an update of data in the first storage apparatus from a host computer, the updated data is written to the first logical volume, as well as to the second logical volume. In this way, redundancy of data in the logical volume of the first storage apparatus and the second storage apparatus is managed according to the remote copy technology.

According to this mechanism, even if the first storage apparatus becomes unusable due to natural disasters such as earthquake and flood, or to man-made disasters such as fire and terrorism, the logical volume of the second storage apparatus can be used to quickly resume business operations.

However, the remote copy fails to function when data cannot be written to the replication destination logical volume. As a result, duplicated data state, in which data is in both the replication source logical volume and the replication destination logical volume, cannot be maintained until the replication destination logical volume recovers, which reduces the degree of redundancy provided for data in the replication source logical volume.

SUMMARY OF THE INVENTION

The present invention has been conceived in view of the above, and relates to a control method for controlling an information processing system and an information processing system.

In accordance with an embodiment of the present invention, there is provided a method for controlling an information processing system that is basically composed of a first storage apparatus equipped with a first logical volume, a second storage apparatus equipped with a second logical volume, a third storage apparatus equipped with a third logical volume, an information processing apparatus that accesses the first storage apparatus, a first communication module to communicatively connect the first storage apparatus with the second storage apparatus, and a second communication module to communicatively connect the first storage apparatus with the third storage apparatus. The method comprises a step of executing a replication management processing from the first logical volume to the second logical volume, when there is a data write request sent from the information processing apparatus to the first storage apparatus, and the first storage apparatus stores data in the first logical volume according to the data write request and also sends the data to the second storage apparatus, which, upon receiving the data, stores the data in the second logical volume, and a step of beginning a replication management processing from the first logical volume to the third logical volume, when there is a request to execute a failover from the information processing apparatus to the first storage apparatus, and the first storage apparatus sends the data to the third storage apparatus, which, upon receiving the data, stores the data in the third logical volume.

According to the present invention, due to the fact that contents of the first logical volume are consistent with contents of the second logical volume or of the third logical volume, the redundancy of data in the first logical volume can be maintained at all times.

Other features and advantages of the invention will be apparent from the following detailed description, taken in conjunction with the accompanying drawings that illustrate, by way of example, various features of embodiments of the invention.

DESCRIPTION OF THE PREFERRED EMBODIMENTS

The following is a detailed description of the embodiments of the present invention with references to drawings.

[Configuration of an Information Processing System]

Figure 1:
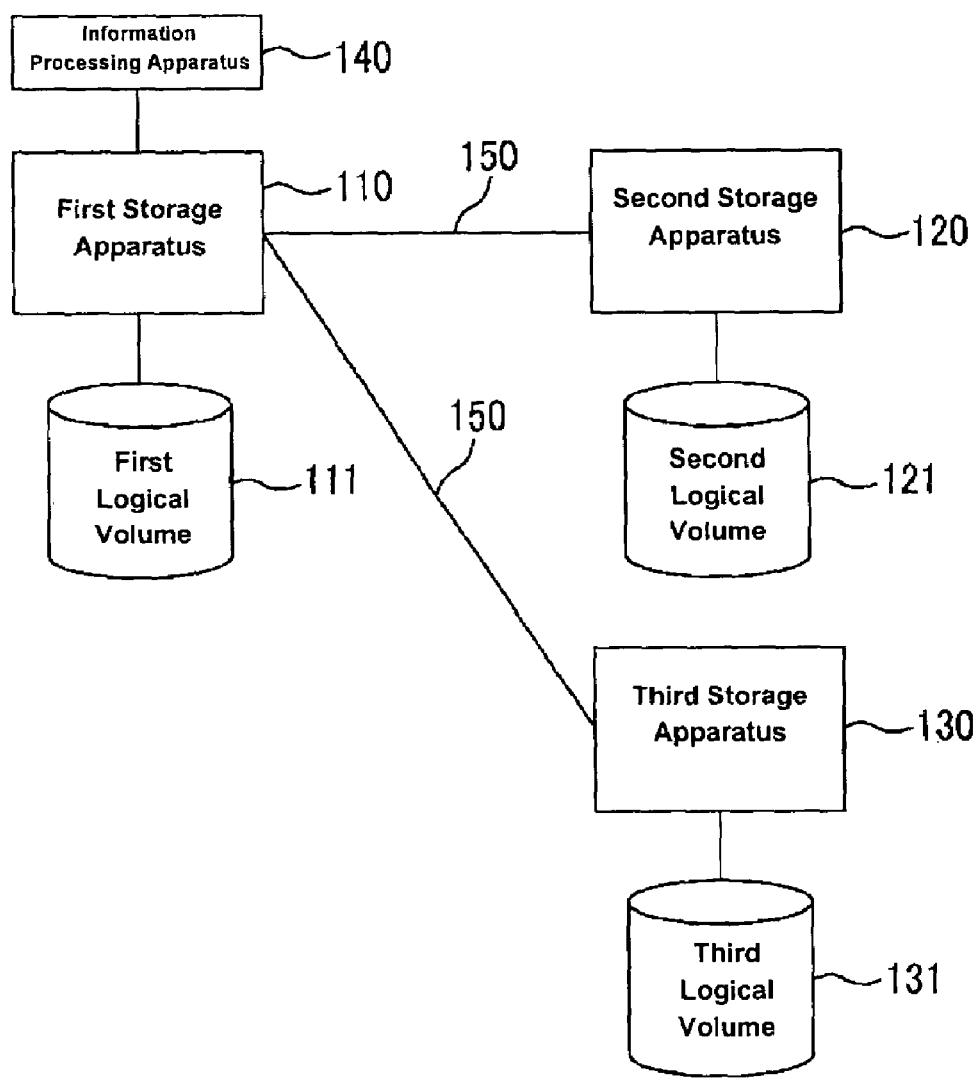
FIG. 1 shows a diagram of an overview of an information processing system in accordance with an embodiment example of the present invention.

FIG. 1 is an overview of an information processing system as one embodiment example of the present invention. The information processing system comprises three or more storage apparatuses 110,120 and 130, each installed at a different site, and an information processing apparatus 140 that accesses the first storage apparatus 110. Specifically, such sites are, for example, computer facilities operated by organizations such as universities and corporations, as well as data centers at which Web servers on the Internet and ASP (Application Service Provider) are operated. Such modes of the information processing system are constructed to realize disaster recovery in the event of an earthquake, fire, hurricane, flood, lightning, terrorism, etc.

The storage apparatuses 120 and 130 other than the first storage apparatus 110 are communicatively connected to the first storage apparatus 110 via networks 150. The networks 150 are, for example, Gigabit Ethernet®, ATM (Asynchronous Transfer Mode) and public telephone lines. The first storage apparatus 110, the second storage apparatus 120, the third storage apparatus 130 that are each installed at a different site are provided with first, second and third logical volumes 111,121 and 131, respectively. The storage apparatuses 120 and 130 other than the first storage apparatus 110 can be installed at the same site. Furthermore, the second storage apparatus 120 and the third storage apparatus 130 can be the same storage apparatus. In this case, the storage apparatus can be provided with the second and third logical volumes 121 and 131.

[Configuration of the Information Processing Apparatus]

The information processing apparatus 140 is a computer provided with a CPU (Central Processing Unit) and memory, and can be a personal computer, workstation or mainframe. The information processing apparatus 140 can be a single computer or a plurality of computers. An operating system operates on the information processing apparatus 140. And application software operates on the operating system.

The application software provides, for example, functions of an automatic deposit and payment system for banks or seat reservation system for airlines. The information processing apparatus 140 and the first storage apparatus 110 are connected to each other via a communication means (e.g., a communication line or network). The communication means can, for example, be LAN (Local Area Network), SAN (Storage Area Network), iSCSI (Internet Small Computer System Interface), ESCON (Enterprise System Connection)®, FICON (Fiber Connection)®, ACONARC (Advanced Connection Architecture)®, FIBARC (Fiber Connection Architecture)®.

[Configuration of Storage Apparatus]

Figure 2:
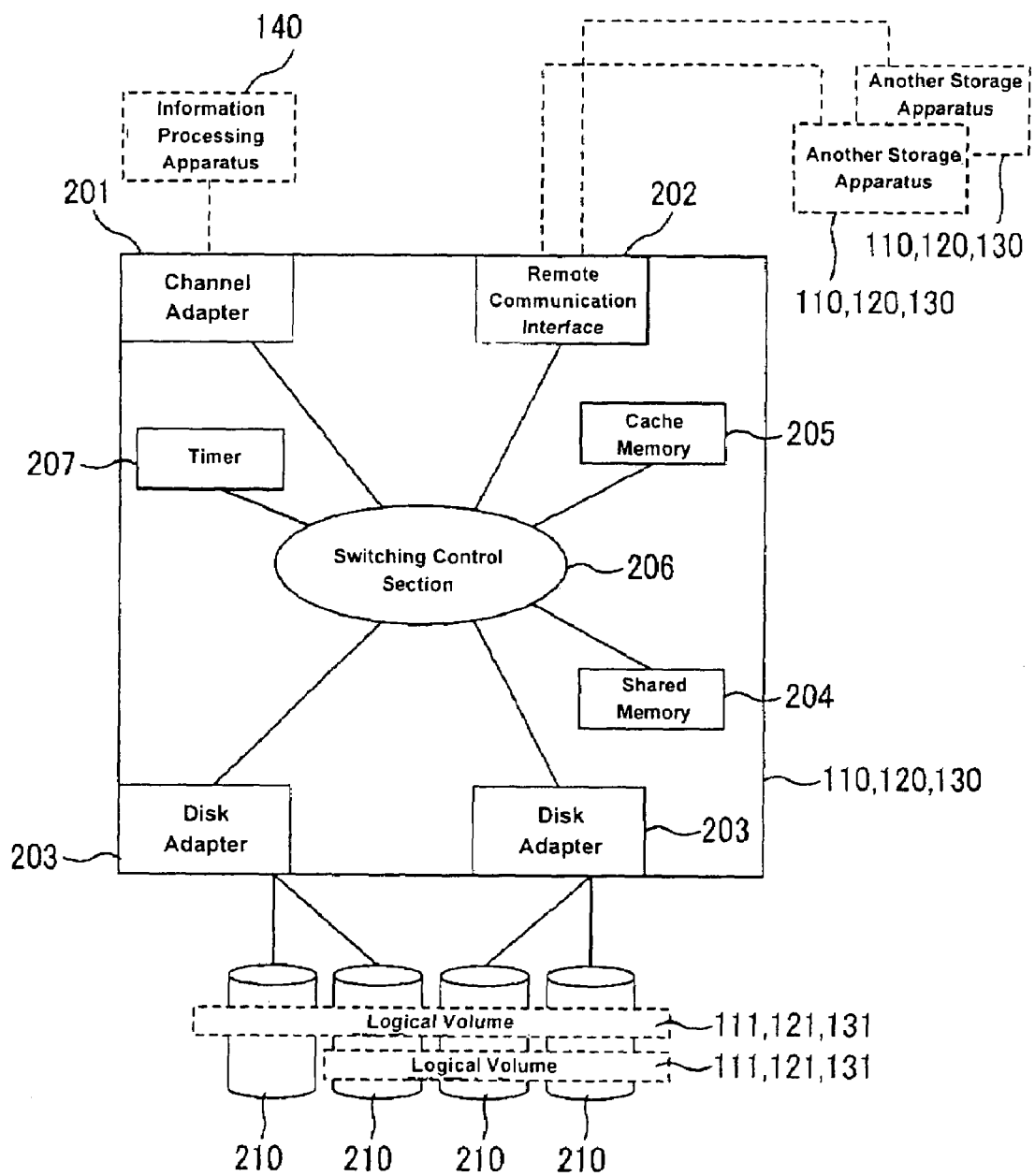
FIG. 2 shows a diagram of the configuration of a disk array apparatus in accordance with an embodiment example of the present invention.

FIG. 2 shows a specific configuration of a disk array apparatus as an example of the first through third storage apparatuses 110,120 and 130. The first through third storage apparatuses 110,120 and 130 may be semiconductor storage apparatuses, for example, instead of disk array apparatuses. Each disk array apparatus comprises a channel adaptor 201, a remote communications interface 202, a disk adaptor 203, a shared memory 204, a cache memory 205, a switching control section 206 comprising a crossbar switch that communicatively connects other elements, a timer 207, and disk drives 210.

The channel adaptor 201 has a CPU and memory and primarily provides communications functions between the storage apparatus and the information processing apparatus 140. The channel adaptor 201 receives data I/O requests from the information processing apparatus 140 and writes the data I/O requests to the shared memory 204. Remote copy functions and functions to change usage mode of remote copy in conjunction with failovers and failbacks, which are described later, are provided as a result of the CPU of the channel adaptor 201 executing programs that realize such functions. Although an information processing system according to the present invention is feasible without the channel adaptor 201 provided on the storage apparatuses 120 and 130 other than the first storage apparatus 110, a CPU and memory would have to be separately provided for each of them.

The cache memory 205 is primarily used to temporarily store data sent and received between the channel adaptor 201 and the disk adaptor 203. For example, if a data input/output command received by the channel adaptor 201 from the information processing apparatus 140 is a write command, the channel adaptor 201 writes the write data received from the information processing apparatus 140 to the cache memory 205. The disk adaptor 203 reads the write data from the cache memory 205 and writes the data to the disk drives 210.

The disk adaptor 203 executes processing such as data writing and reading to and from the disk drives 210 according to commands (e.g., SCSI (Small Computer System Interface) standard commands) set in data I/O requests written by the channel adaptor 201 in the shared memory 204. The disk adaptor 203 writes data read from the disk drives 210 to the cache memory 205. In addition, the disk adaptor 203 sends data write completion notices and data read completion notices to the channel adaptor 201. The disk adaptor 203 may also have a function to control the disk drives 210 according to RAID (Redundant Array of Inexpensive Disks) levels (for example, levels 0, 1, 5) stipulated according to what is called the RAID method.

The disk drives 210 are, for example, hard disk drive apparatuses. The disk drives 210 can form a unitary structure with disk array apparatuses or can be separate. Storage regions provided by the disk drives 210 at various sites are managed in units of the corresponding logical volume 111,121 or 131 that is logically set in the respective storage regions. Reading and writing of data to and from the disk drives 210 can be done by designating an identifier (e.g., an ID number) assigned uniquely to each of the logical volumes 111,121 and 131.

The remote communications interface 202 is a communications interface (i.e., a channel extender) to transfer data with another storage apparatus 110,120 or 130, and the transfer of replication data that takes place in remote copy, described later, takes place via the remote communications interface 202. The remote communications interface 202 converts the interface of the channel adaptor 201 (e.g., ESCON®, FICON® interface) to the communications method of the corresponding network 150. This allows data transfer with another storage apparatus 110,120 or 130 to be realized.

The timer 207 monitors the time at which several processing are performed according to the present embodiment.

In addition to the configurations described above, the disk array apparatuses can alternatively be apparatuses that function as NAS (Network Attached Storage) that are configured to accept data input/output requests in filename designations from the information processing apparatus 140 according to such protocols as NFS (Network File System), for example.

[Remote Copying]

When the first storage apparatus 110 stores data in the first logical volume 111 according to a data write request sent from the information processing apparatus 140, a remote copy (a replication management processing) from the first logical volume 111 to the second logical volume 121 takes place, in which the first storage apparatus 110 sends the data to the second storage apparatus 120, which, upon receiving the data, stores the data in the second logical volume 121.

When the first storage apparatus 110 stores data in the first logical volume 111 according to a data write request sent from the information processing apparatus 140, a remote copy from the first logical volume 111 to the third logical volume 131 may take place, in which the first storage apparatus 110 sends the data to the third storage apparatus 130, which, upon receiving the data, stores the data in the third logical volume 131.

A remote copy refers to a processing to replicate and manage data among a plurality of storage apparatuses installed at physically remote sites, without the intervention of the information processing apparatus 140. In other words, a remote copy takes place to make contents of counterpart logical volumes consistent. Two logical volumes between which a remote copy takes place are called logical volumes that form a "pair." Hereinafter a state in which a remote copy is executed from the first logical volume 111 to the second logical volume 121 is called a "normal state."

A remote copy from the first logical volume 111 to the third logical volume 131 takes place when there is a request to execute a failover between these logical volumes based on an instruction from a system administrator. In addition, such failovers sometimes take place automatically. Hereinafter a state in which a remote copy is executed from the first logical volume 111 to the third logical volume 131 is called a "failover state."

There are synchronous and asynchronous methods for remote copy. In the synchronous method, upon receiving from the information processing apparatus 140 a data I/O request instructing a data write to the first logical volume 111, the first storage apparatus 110 first writes data to its own first logical volume 111. It also sends to the other storage apparatus 120 or 130 the same data as it has written to the first logical volume 111. The storage apparatus 120 or 130 writes the data received to the logical volume 121 or 131, respectively, and sends a completion notice to the first storage apparatus 110. Upon receiving the notice, the first storage apparatus 110 sends to the information processing apparatus 140 a message notifying that the data write has been completed.

In this way, according to the synchronous method, the completion notice is sent to the information processing apparatus 140 after it is confirmed that the data has been written to both the first logical volume 111 and to the other logical volume 121 or 131. As a result, consistency between contents of the first logical volume 111 and contents of the other logical volume 121 or 131 is secured when the information processing apparatus 140 receives the completion notice according to the synchronous method. However, the completion notice is not sent to the information processing apparatus 140 until data write to the other logical volume 121 or 131 is completed. Consequently, the response time in the synchronous method from the time a data I/O request is sent from the information processing apparatus 140 to the time a completion notice is sent back to the information processing apparatus 140 is generally longer than in the asynchronous method.

On the other hand, according to the asynchronous method, upon receiving from the information processing apparatus 140 a data I/O request instructing a data write to the first logical volume 111, the first storage apparatus 110 writes data to its own first logical volume 111 in response to the request. Also, data that is the same as the data written is written to the other logical volume 121 or 131, and a notification to that effect is sent to the first storage apparatus 110. Upon writing the data to the first logical volume 111, the first storage apparatus 110 immediately sends a completion notice to the information processing apparatus 140 regardless of whether the data has been written to the logical volume 121 or 131. As a result, the response time to the information processing apparatus 140 in the asynchronous method is generally shorter than in the synchronous method. However, the consistency of data in the first logical volume 111 with data in the logical volume 121 or 131 is not necessarily guaranteed. According to the asynchronous method, data not reflected on the storage apparatus 120 or 130 is managed in the first storage apparatus 110.

[Initializing Replication Processing (Initial Copying)]

As described above, in remote copy, only differential data is basically sent from the first storage apparatus 110 to the other storage apparatus 120 or 130. As a result, when, for example, beginning a remote copy while the first storage apparatus 110 is already operating and accumulating data to its first logical volume 111, contents of the other logical volume 121 or 131 in which data would be stored must first be made consistent with contents of the first logical volume 111. Further, when a remote copy is already in progress but the logical volume 121 or 131 stops functioning due to failure and is replaced by a new logical volume 121 or 131, contents of the replacement logical volume 121 or 131 must be set up to be consistent with contents of the first logical volume 111. When contents of the logical volume 121 or 131 that is set to form a pair with the first logical volume 111 are not consistent with contents of the logical volume 111, an initializing replication processing takes place. The initializing replication processing refers to a processing to make contents among logical volumes of a plurality of storage apparatuses installed at physically remote sites consistent with each other in advance (hereinafter called an "initial copy"). The initial copy is executed in various circumstances.

Hereinafter a state in which an initial copy is being executed from the first logical volume 111 to the second logical volume 121 is called a "normal initial copy-in-progress state." When there is a failover execution request in a normal state from the information processing apparatus 140, a state in which an initial copy is being executed from the first logical volume 111 to the third logical volume 131 in order to make contents of the third logical volume 131 consistent with contents of the first logical volume 111 in advance is called a "duplication failover-in-progress state."

A state in which an initial copy is being executed from the first logical volume 111 to the third logical volume 131 in order to failover to the third logical volume 131 when data cannot be written to the second logical volume 121 is called a "failover initial copy-in-progress state." Situations in which data cannot be written to the second logical volume 121 include situations in which power is not supplied to the second storage apparatus 120, a failure has occurred, the second storage apparatus 120 having the second logical volume 121 is sending or receiving data to or from another information processing apparatus 140 or the other storage apparatus 110 or 130, and data write is prohibited by a system administrator.

[Re-Initializing Replication Processing]

When it is determined that data can be written to the second logical volume 121 in a failover state or in a failover initial copy-in-progress state, a re-initializing replication processing takes place. The re-initializing replication processing refers to a processing to make contents of the first logical volume 111 and contents of the second logical volume 121 consistent (i.e., an initial copy), in order to have the second logical volume 121 take over (i.e., a failback) a processing that was being performed on the third logical volume 131 in a failover state or failover initial copy-in-progress state. In other words, the re-initializing replication processing refers to making contents of the first logical volume 111 and contents of the second logical volume 121 consistent before performing a remote copy between the first logical volume 111 and the second logical volume 121. As a processing to make contents of these logical volumes consistent with each other, the first storage apparatus 110 can send all data in its first logical volume 111 to the second storage apparatus 120, and the second storage apparatus 120 upon receiving the data can store all data from the first logical volume 111 in its own logical volume 121. Alternatively, a differential bitmap can be created upon comparing the first logical volume 111 with the second logical volume 121 and data that differ in the contents of the first logical volume 111 and the second logical volume 121 can be stored in the second logical volume 121. Hereinafter a state in which the re-initializing replication processing from the first logical volume 111 to the second logical volume 121 is being executed, based on a determination that data can be written to the second logical volume 121 during a failover state, is called a "failback-in-progress state."

[Data Replication Processing in Various States]

Figure 3:
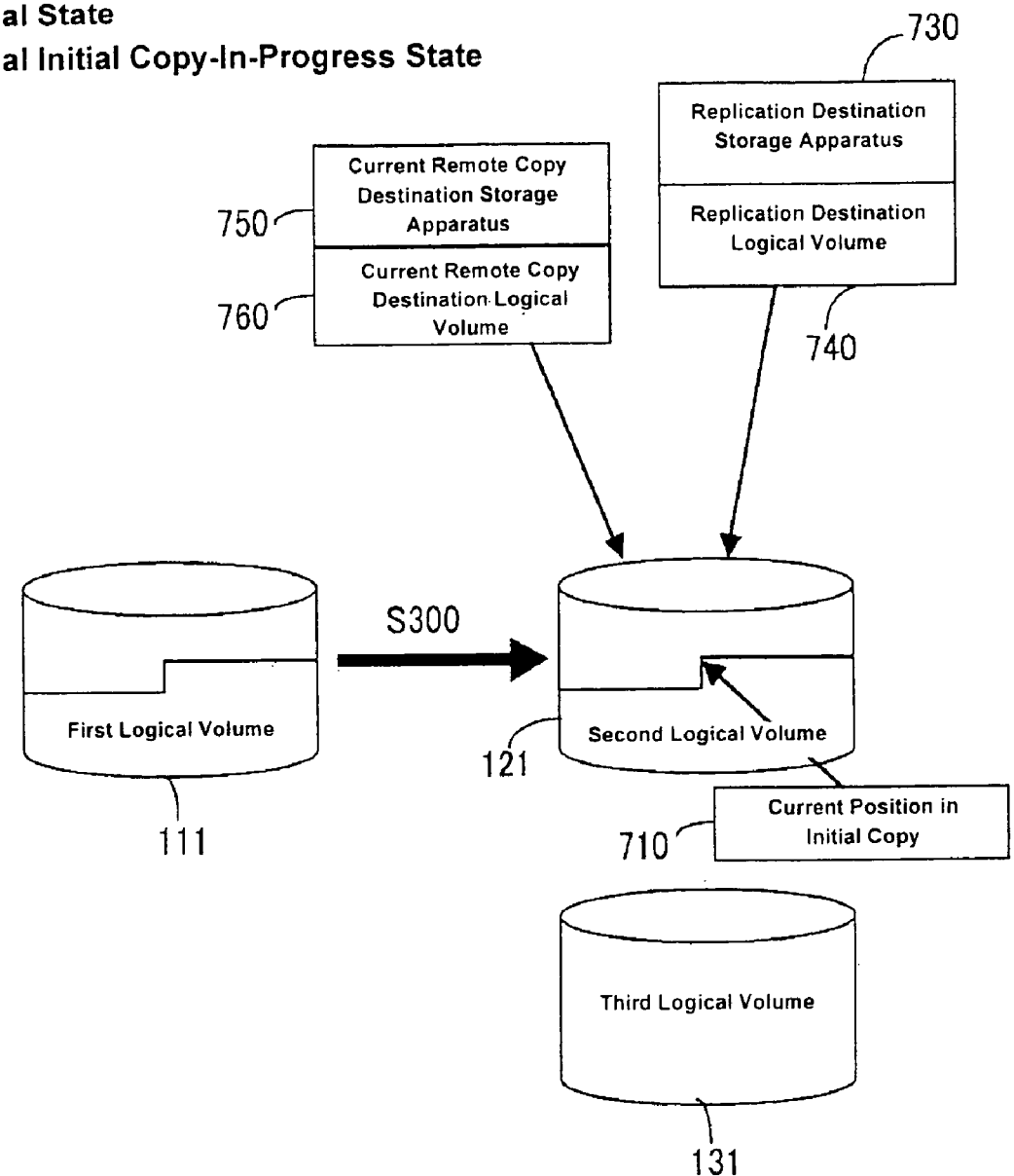
FIG. 3 shows a conceptual illustration of a data replication processing in a normal state and in a normal initial copy-in-progress state in accordance with an embodiment example of the present invention.

FIG. 3 shows a conceptual illustration of a data replication processing in a normal state or a normal initial copy-in-progress state. S300 indicates that a remote copy or initial copy is taking place from the first logical volume 111 to the second logical volume 121.

Figure 4:
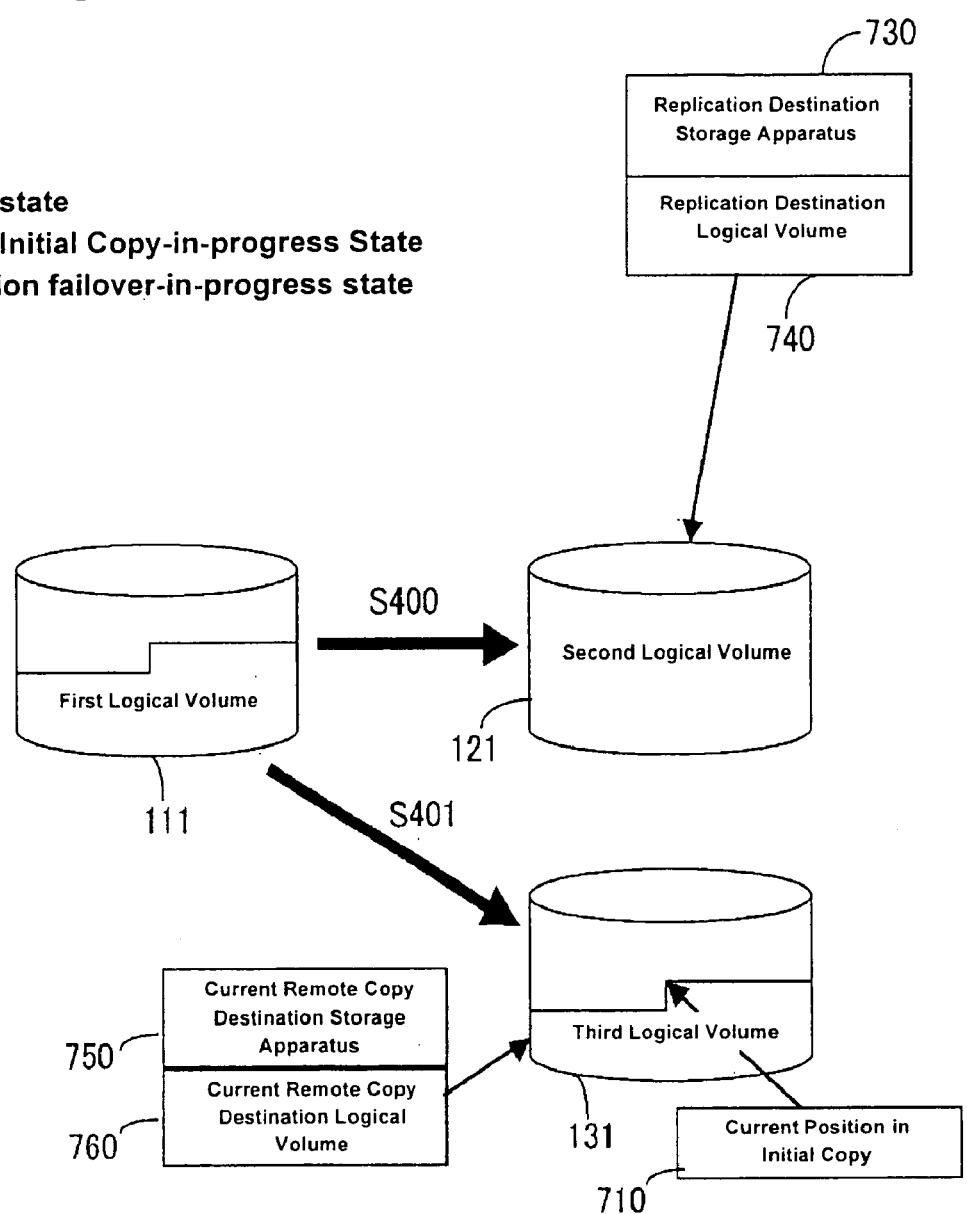
FIG. 4 shows a conceptual illustration of a data replication processing in a failover state, a failover initial copy-in-progress state, and in a duplication failover-in-progress state illustrated as one embodiment example of the present invention.

FIG. 4 shows a conceptual illustration of a data replication processing in a failover state, a failover initial copy-in-progress state, or a duplication failover-in-progress state. S400 indicates that a remote copy is taking place from the first logical volume 111 to the second logical volume 121, which is valid only in a duplication failover-in-progress state. Consequently, in the duplication failover-in-progress state, contents of the first logical volume 111 are consistent with contents of the second logical volume 121. S401 indicates that a remote copy or an initial copy is taking place from the first logical volume 111 to the third logical volume 131.

Figure 5:
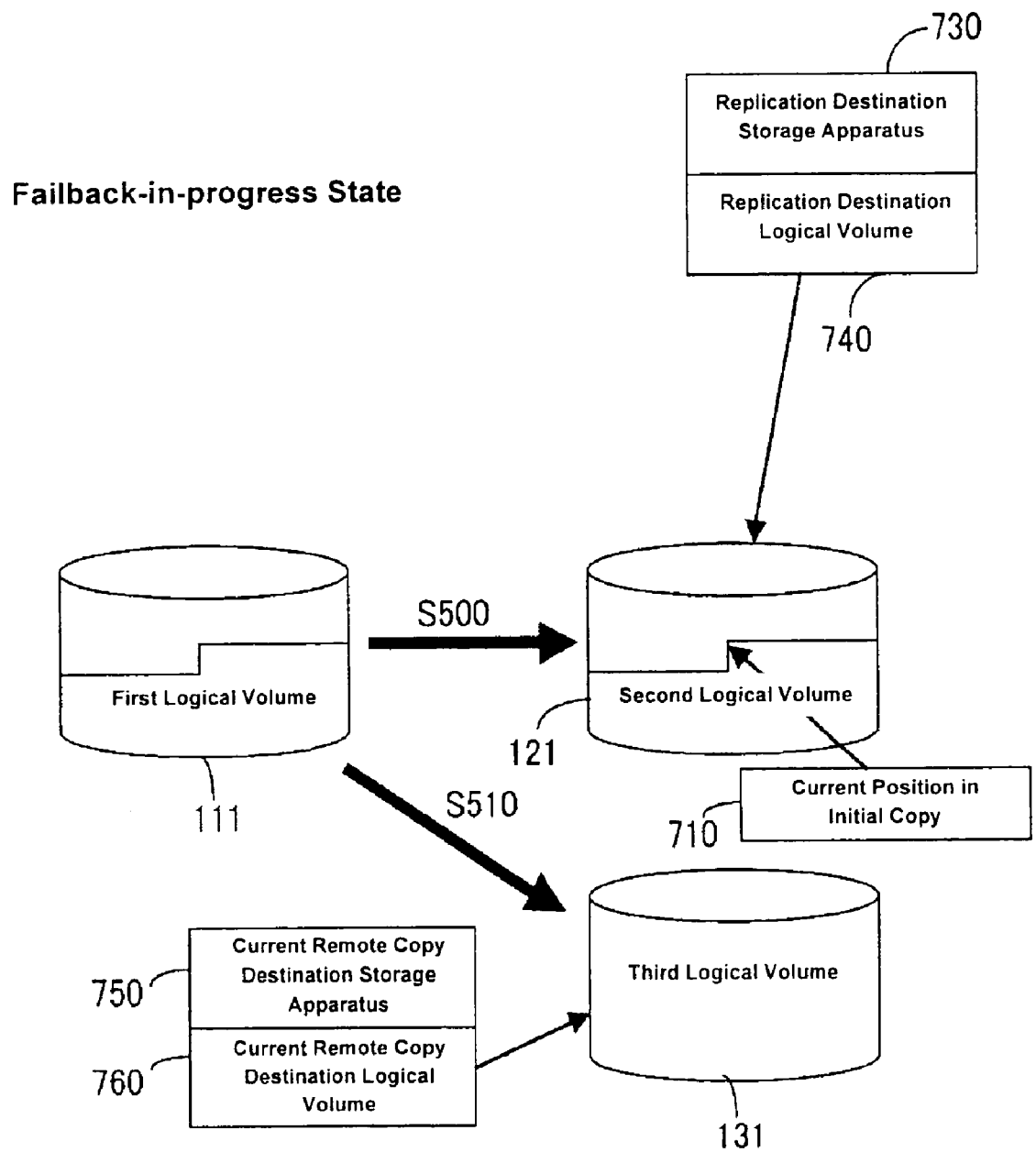
FIG. 5 shows a conceptual illustration of a data replication processing in a failback-in-progress state illustrated as one embodiment example of the present invention.

FIG. 5 shows a conceptual illustration of a data replication processing in a failback-in-progress state. S500 indicates that an initial copy is taking place from the first logical volume 111 to the second logical volume 121. S510 indicates that a remote copy is taking place from the first logical volume 11 to the third logical volume 131. As a result, in the failback-in-progress state, during the execution (i.e., from the time the processing begins to the time the processing ends) of an initial copy from the first logical volume 111 to the second logical volume 121, a remote copy is separately taking place from the logical volume 111 to the third logical volume 131.

[Status Transfer Diagram]

Figure 6:
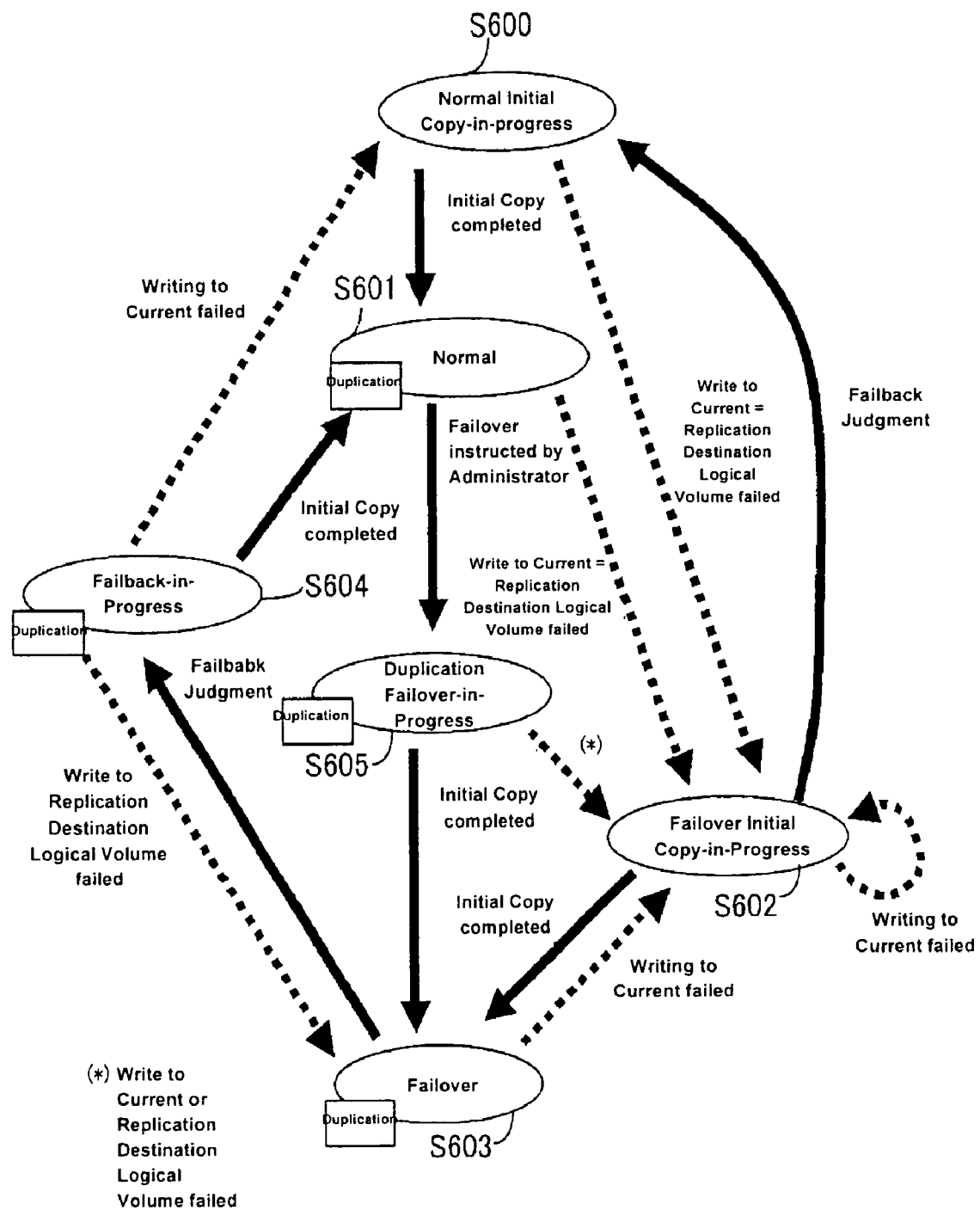
FIG. 6 shows a diagram of status transfer corresponding to the embodiment examples of the present invention.

FIG. 6 shows a status transfer diagram of the present embodiment. The following is a description of conditions for transfer between various states.

<S601 to S603>

When there is a failover execution request in a normal state S601 from the information processing apparatus 140 to the first storage apparatus 110, the status transfers to a failover state S603.

The failover execution request is made, for example, in order to inspect the second storage apparatus 120. For this reason, a remote copy from the first logical volume 111 to the second logical volume 121 cannot take place. As a result, a failover to the third logical volume 131 takes place, and a remote copy from the first logical volume 111 to the third logical volume 131 begins.

<Normal Initial Copy-in-Progress State S600>

As described above, in order to begin a remote copy from the first logical volume 111 to the second logical volume 121 in the normal state S601, an initial copy to make contents of the second logical volume 121 consistent with contents of the first logical volume 111 is being executed in the normal initial copy-in-progress state S600.

Once the initial copy is completed, the status transfers to the normal state S601.

<Duplication Failover-in-Progress State S605>

As described above, when there is a failover execution request in the normal state S601 from the information processing apparatus 140 to the first storage apparatus 110, the status transfers to the failover state S603. In the failover state S603, a remote copy from the first logical volume 111 to the third logical volume 131 is executed. However, to begin this remote copy, an initial copy to make contents of the third logical volume 131 consistent with contents of the first logical volume 111 in advance must take place. In a duplication failover-in-progress state S605, an initial copy to make contents of the third logical volume 131 consistent with contents of the first logical volume 111 is being executed.

Once the initial copy from the first logical volume 111 to the third logical volume 131 in the duplication failover-in-progress state S605 is completed, the status transfers to the failover state S603.

<S601 to S602>

When data cannot be written in the normal state S601 to the second logical volume 121 (i.e., a failure to write to the current=the replication destination logical volume), the status transfers to a failover initial copy-in-progress S602.

When data sent from the first storage apparatus 110 cannot be written (i.e., a write failure) to the second logical volume 121 in the normal state S601, a processing to begin an initial copy to make contents of the third logical volume 131 consistent with contents of the first logical volume 111 takes place automatically.

<S605 to S602>

When data cannot be written in the duplication failover-in-progress state S605 to the third logical volume 131 or to the second logical volume 121 (i.e., a failure to write to the current or the replication destination logical volume), the status transfers to the failover initial copy-in-progress state S602.

When data cannot be written to the second logical volume 121 in the duplication failover-in-progress state S605, a remote copy from the first logical volume 111 to the second logical volume 121 is suspended. A processing to continue only the initial copy to make contents of the third logical volume 131 consistent with contents of the first logical volume 111 takes place.

On the other hand, if data cannot be written to the third logical volume 131 in the duplication failover-in-progress state S605, an initial copy from the first logical volume 111 to the third logical volume 131 is suspended. A processing to perform an initial copy to make contents of a fourth logical volume consistent with contents of the first logical volume 111 takes place.

The above description is applicable when the fourth logical volume is provided, but when the fourth logical volume is not provided, an initial copy from the first logical volume 111 to the third logical volume 131 can be re-tried. Alternatively, data writing can be set up to standby until data can be written to the third logical volume 131. Furthermore, when a system administrator makes a failover execution request, whether data can be written to the third logical volume 131 is determined; if it is determined that data cannot be written to the third logical volume 131, a message to that effect can be sent to the system administrator.

<S600 to S602>

When data cannot be written in the normal initial copy-in-progress state S600 to the second logical volume 121 (i.e., a failure to write to the current =the replication destination logical volume), the status transfers to the failover initial copy-in-progress S602.

In other words, when data cannot be written to the second logical volume 121 in the normal initial copy-in-progress state S600, a pair comprising the first logical volume 111 and the second logical volume 121 cannot be formed. A processing to perform an initial copy to make contents of the third logical volume 131 consistent with contents of the first logical volume 111 therefore takes place, so that a failover to the third logical volume 131 and a remote copy from the first logical volume 111 to the third logical volume 131 can be performed.

<S602 to S602>

When data cannot be written in the failover initial copy-in-progress state S602 (i.e., a failure to write to the current volume), the status reverts back to the failover initial copy-in-progress state S602.

When data cannot be written to the third logical volume 131 in the failover initial copy-in-progress S602, an initial copy from the first logical volume 111 to the third logical volume 131 is suspended, and a processing to perform an initial copy from the first logical volume 111 to the fourth logical volume takes place.

The above description is applicable when the fourth logical volume is provided, but when the fourth logical volume is not provided, an initial copy from the first logical volume 111 to the third logical volume 131 can be re-tried. Alternatively, data writing can be set up to standby until data can be written to the third logical volume 131.

<S603 to S602>

When data cannot be written in the failover state S603 to the third logical volume 131 (i.e., a failure to write to the current logical volume), the status transfers to the failover initial copy-in-progress state S602.

When data cannot be written to the third logical volume 131 in the failover state S603, a remote copy from the first logical volume 111 to the third logical volume 131 cannot be continued. Consequently, the remote copy from the first logical volume 111 to the third logical volume 131 is suspended, and a processing to perform an initial copy to make contents of the fourth logical volume consistent with contents of the first logical volume 111 takes place.

Again, when the fourth logical volume is not provided, an initial copy from the first logical volume 111 to the third logical volume 131 can be re-tried. Alternatively, data writing can be set up to standby until data can be written to the third logical volume 131.

<S602 to S603>

When an initial copy to make contents of the third logical volume 131 consistent with contents of the first logical volume 111 is completed in the failover initial copy-in-progress state S602, the status transfers to the failover state S603.

When an initial copy to make contents of the third logical volume 131 consistent with contents of the first logical volume 111 is completed, a processing to begin a remote copy from the first logical volume 111 to the third logical volume 131 takes place, since the contents of the logical volumes 111 and 131 have been made consistent.

The same processing applies when the third logical volume 131 is replaced by the fourth logical volume.

<S603 to S604>

When it is determined in the failover state S603 that data can be written to the second logical volume 121 through a failback determination processing, described later, the status transfers to a failback-in-progress state S604.

For example, in the failover initial copy-in-progress state S602, the second logical volume 121 sometimes resumes normal function after the inspection of the second storage apparatus 120 finishes. In such cases, a processing to begin an initial copy (a re-initializing replication processing) to make contents of the second logical volume 121 consistent with contents of the first logical volume 111 takes place.

To shorten the time involved in the re-initializing replication processing, a differential bitmap can be created by comparing the first logical volume 111 to the second logical volume 121, and data that is the discrepancy between the first logical volume 111 and the second logical volume 121 can be stored in the second logical volume 121.

<S602 to S600>

When it is determined in the failover initial copy-in-progress state S602 that data can be written to the second logical volume 121 through a failback determination processing, described later, the status transfers to the normal initial copy-in-progress state S600.

In the failover initial copy-in-progress state S602, the second logical volume 121 sometimes resumes normal function after the inspection of the second storage apparatus 120 finishes. In such cases, an initial copy from the first logical volume 111 to the third logical volume 131 is suspended, and a processing to begin an initial copy (a re-initializing replication processing) to make contents of the second logical volume 121 consistent with contents of the first logical volume 111 takes place.

To shorten the time involved in the re-initializing replication processing, a differential bitmap can be created by comparing the first logical volume 111 to the second logical volume 121, and data that is the discrepancy between the first logical volume 111 and the second logical volume 121 can be stored in the second logical volume 121.

When it is determined that performing an initial copy from the first logical volume 111 to the third logical volume 131 would be better even if it is determined that data can be written to the second logical volume 121, a processing to continue the initial copy from the first logical volume 111 to the third logical volume 131 may take place. This processing would take place, for example, when the initial copy processing from the first logical volume 111 to the third logical volume 131 would be shorter and when the first logical volume 111 and the third logical volume 131 can form a pair.

<S604 to S601>

When an initial copy (a re-initializing replication processing) to make contents of the second logical volume 121 consistent with contents of the first logical volume 111 is completed in the failback-in-progress state S604, the status transfers to the normal state S601.

<S604 to S603>

When data cannot be written to the second logical volume 121 in the failback-in-progress state S604 (i.e., a failure to write to the replication destination logical volume), the status transfers to the failover state S603.

As described above, a re-initializing replication processing to make contents of the second logical volume 121 consistent with contents of the first logical volume 111 takes place in the failback-in-progress state S604, but a remote copy from the first logical volume 111 to the third logical volume 131 is also taking place. Consequently, when data cannot be written to the second logical volume 121, the re-initializing replication processing to make contents of the second logical volume 121 consistent with contents of the first logical volume 111 is suspended, and a processing to perform only the remote copy from the first logical volume 111 to the third logical volume 131 takes place.

<S604 to S600>

When data cannot be written to the third logical volume 131 in the failback-in-progress state S604 (i.e., a failure to write to the current logical volume), the status transfers to the normal initial copy-in-progress state S600.

When data cannot be written to the third logical volume 131 in the failback-in-progress state S604, the remote copy from the first logical volume 111 to the third logical volume 131 is suspended, and a processing to continue the re-initializing replication processing to make contents of the second logical volume 121 consistent with contents of the first logical volume 111 takes place.

As described above, in the normal state S601, the failover state S603, the failback-in-progress state S604 and in the duplication failover-in-progress state S605, redundancy (a duplicated state) of the first logical volume 111 is maintained, such that contents that are identical to contents of the first logical volume 111 exist in either the second logical volume 121 or the third logical volume 131. According to the present invention, redundancy is secured even in the failback-in-progress state S604, such that the redundancy of the first logical volume 111 is maintained throughout the process from the failover state S603 to the normal state S601 via the failback-in-progress state S604. Similarly, even when there is a failback execution request based on an instruction from an administrator, the redundancy of the first logical volume 111 is maintained throughout the process involving failover and failback, beginning with the normal state S601, to the duplication failover-in-progress state S605, to the failover state S603, to the failback-in-progress state S604, and ending with the normal state S601.

[Tables]

Figure 7:
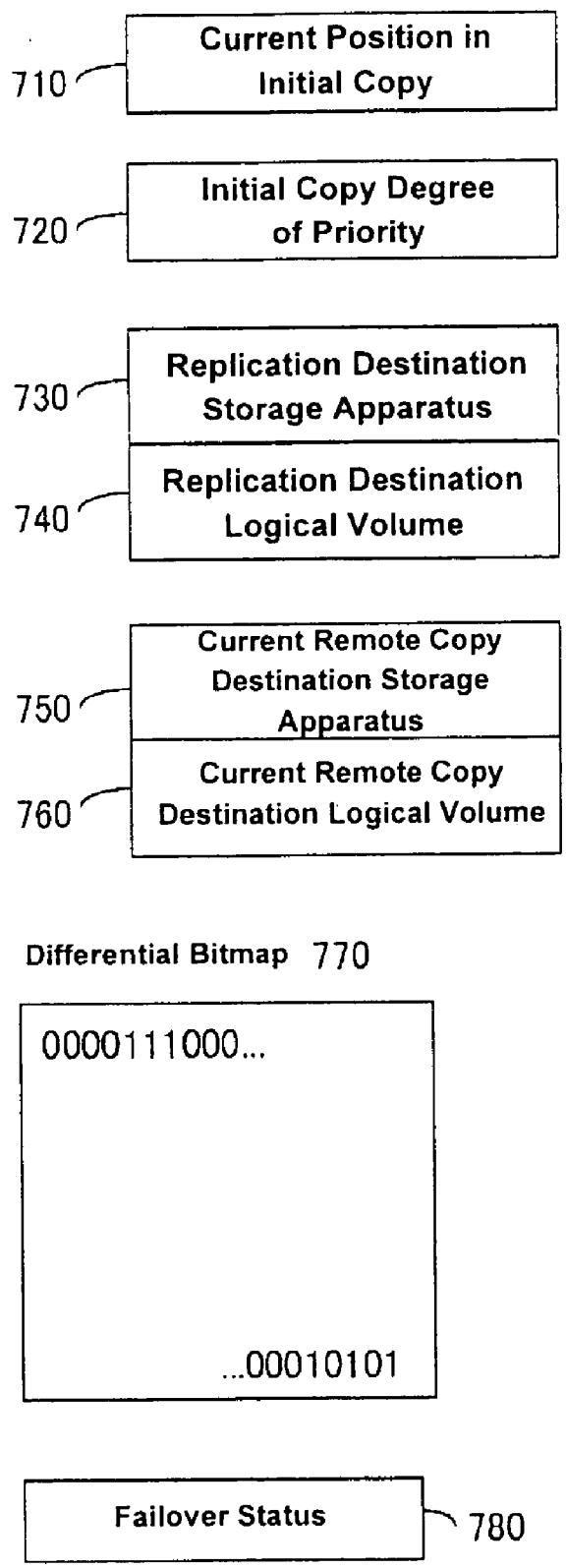
FIG. 7 shows tables used in one embodiment example of the present invention.
Figure 8:
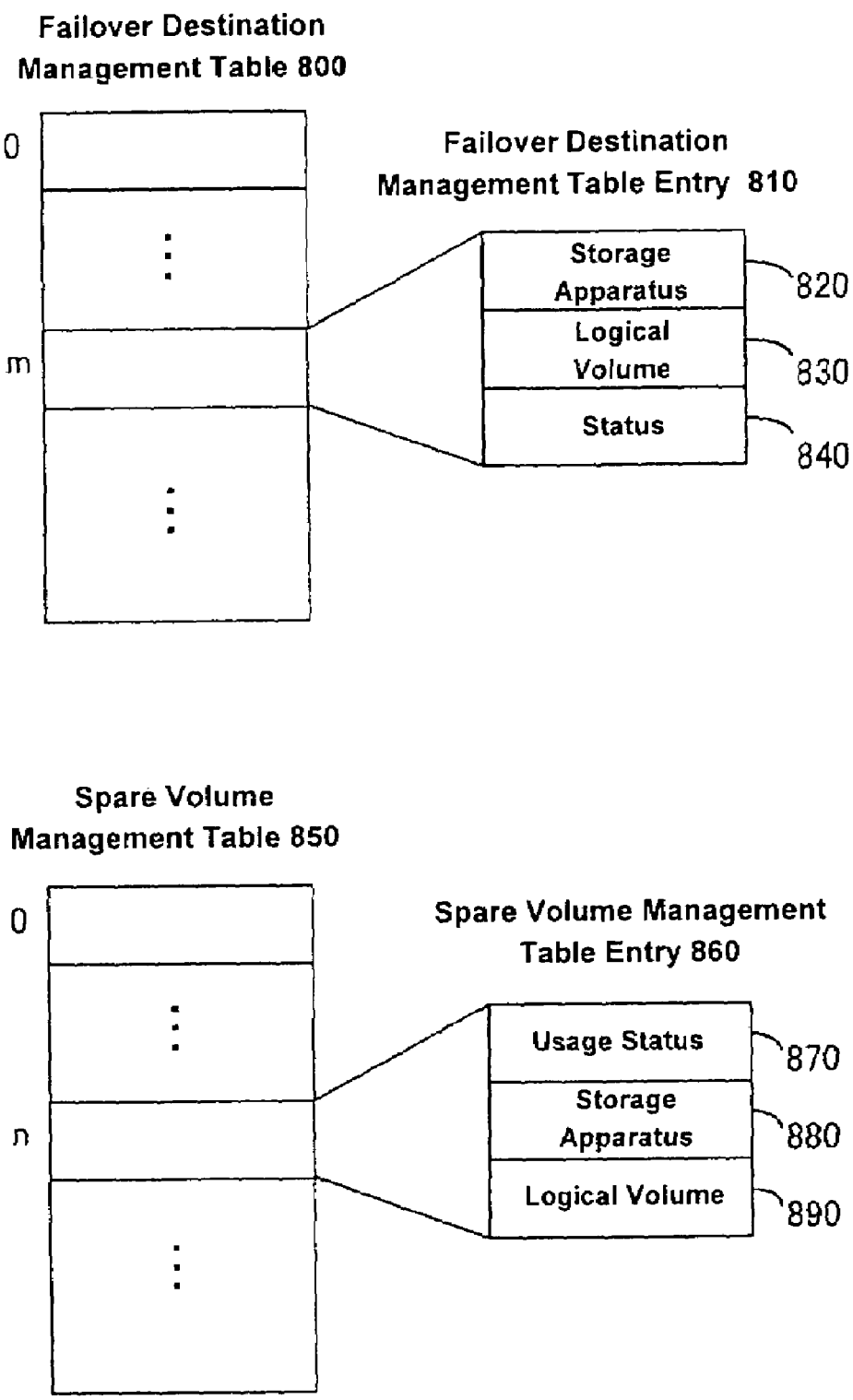
FIG. 8 shows tables used in one embodiment example of the present invention.

FIGS. 7 and 8 show tables referred to in the following description. The tables include tables of a current position in initial copy 710, an initial copy degree of priority 720, a replication destination storage apparatus 730, a replication destination logical volume 740, a current remote copy destination storage apparatus 750, a current remote copy destination logical volume 760, a differential bitmap 770, and a failover status 780. These tables are stored in the memory of the channel adaptor 201, the shared memory 104, or in the disk drives 210, for example.

The current position in initial copy 710 stores the block number representing data to be replicated next in an initial copy processing. Consequently, when all blocks in the third logical volume 131 that correspond to the blocks in the first logical volume 111 have the value "1," it indicates that the initial copy has finished.

In the initial copy degree of priority 720 is set the degree of priority placed on the logical volume on which an initial copy processing is to be executed. For example, when the third logical volume 131 is to be given priority in an initial copy, "1" is set for the third logical volume 131; when there is no need to give priority to an initial copy to the second logical volume 121, "0" can be set for the second logical volume 121.

In the present embodiment, ID numbers are assigned to various storage apparatuses and logical volumes in order to identify each of the storage apparatuses 110,120 and 130, as well as each of the logical volumes 111,121 and 131. When an ID number that specifies the second storage apparatus 120 is registered in the replication destination storage apparatus 730, the second storage apparatus 120 is set as the replication destination storage apparatus. When an ID number that specifies the second logical volume 121 is registered in the replication destination logical volume 740, the second logical volume 121 is set as the replication destination logical volume. In this way, by registering ID numbers in the replication destination storage apparatus 730 and the replication destination logical volume 740, a replication destination storage apparatus and a replication destination logical volume can be set. According to the present embodiment, the ID number of the second storage apparatus 120 is registered in the replication destination storage apparatus 730, and the ID number of the second logical volume 121 is registered in the replication destination logical volume 740. Of course, the ID number of the storage apparatus 130 and the ID number of the logical volume 131 can also be registered in the replication destination storage apparatus 730 and the replication destination logical volume 740, respectively.

Similarly, ID numbers of the storage apparatus and the logical volume to which data is currently being replicated are registered in the current remote copy destination storage apparatus 750 and the current remote copy destination logical volume 760. Based on the ID numbers registered in these tables, a storage apparatus (e.g., the first storage apparatus 110) or a system administrator can specify the logical volume to which data is currently being replicated and the storage apparatus that has the logical volume.

The differential bitmap 770 indicates the difference between contents of the first logical volume 111 and contents of the logical volume designated to store write data sent from the first logical volume 111. Through this, the first storage apparatus 110 can determine whether contents of the first logical volume 111 and contents of the logical volume designated to store write data sent from the first logical volume 111 are consistent. For example, by setting blocks of data that are different in contents of the first logical volume 111 and of the second logical volume 121 to "1," while blocks of data that are consistent in the contents between the two logical volumes are set to "0," the determination can be made easily.

In the failover status 780 are registered values that identify various states described earlier. For example, a value of "0" is registered for the normal state or normal initial copy-in-progress state, a value of "1" is registered for the failback-in-progress state, a value of "2" is registered for the duplication failover-in-progress state, and a value of "3" is registered when automatic failback is blocked. Based on these values, a storage apparatus (e.g., the first storage apparatus 110) or a system administrator can check the current status. When there is a plurality of replication source logical volumes other than the first logical volume 111, the failover status table can be provided in each of the logical volumes 111, 121 and 131 and/or in each of the storage apparatuses 110, 120 and 130 having the corresponding logical volumes.

In a failover destination management table 800 are registered all of the storage apparatuses 110, 120 and 130, as well as usage status of each of their logical volumes. Consequently, when a failover takes place, candidate logical volumes can be selected by checking this list.

In each failover destination management table entry 810 of the failover destination management table 800 are registered, for example, an ID number of a storage apparatus (Storage Apparatus) 820 that corresponds to the entry, an ID number indicating a logical volume (Logical Volume) 830 of the storage apparatus, and a status (Status) 840 that indicates whether a failover to the logical volume can take place. In Status 840, "2" is registered if a certain logical volume cannot be set as a spare logical volume (i.e., invalid); "1" is registered if a failover cannot take place due to the fact data cannot be written to a certain logical volume; and "0" is registered if data can be written to a certain logical volume. Situations in which "2" would be registered in Status 840 are situations in which the corresponding logical volume is already set as the replication destination logical volume or the corresponding logical volume already forms a pair with another logical volume.

If at least one or more logical volumes (spare logical volumes) other than the first logical volume 111 and the second logical volume 121 is provided on a certain storage apparatus, a spare volume management table 850 can be provided to manage those logical volumes. According to the present embodiment, the third logical volume 131 and the fourth logical volume are the spare logical volumes.

In each spare volume management table entry 860 of the spare volume management table 850 are recorded, for example, a usage status ("Usage Status") 870 of the entry, an ID number of a storage apparatus ("Storage Apparatus") 880 corresponding to the entry, and an ID number indicating a logical volume ("Logical Volume") 890 of the storage apparatus.

In Usage Status 870 of the spare volume management table entry 860, for example, "0" is registered if the logical volume that corresponds to the entry is usable; "1" is registered if the corresponding logical volume is in use; "2" is registered if the corresponding logical volume is unusable; and "3" is registered if the corresponding logical volume is out of order.

If a value that indicates that the logical volume that corresponds to an entry is in use is set in Usage Status 870, appropriate ID numbers are registered in Storage Apparatus 880 and Logical Volume 890 of the entry 860. More specifically, Storage Apparatus 880 of the entry 860 may register the ID number of a storage apparatus that sends data to the storage apparatus equipped with the logical volume corresponding to the entry. Similarly, Logical Volume 890 of the entry 860 may register the ID number of a logical volume having the data of which the corresponding logical volume stores.

With the spare volume management table 850, the first storage apparatus 110 can ascertain the status of each logical volume. Furthermore, the first storage apparatus 110 can quickly specify usable logical volumes among the spare logical volumes.

Tables can be stored in the first storage apparatus 110, which is the replication source storage apparatus, to the extent possible according to the present embodiment example, or the tables can be stored in other storage apparatuses.

The following summarizes the values set in various tables for each of the states illustrated in FIG. 6:

(1) The normal initial copy-in-progress state S600:
  The failover status 780: "0" (normal initial copy-in-progress state)
  The current remote copy destination storage apparatus 750 and the current remote copy destination logical volume 760: the second logical volume 121
  The current position in initial copy 710: in progress (2) The normal state S601 (initial copy completed):
  The failover status 780: "0" (normal state)
  The current remote copy destination storage apparatus 750 and the current remote copy destination logical volume 760: the second logical volume 121
  The current position in initial copy 710: completed (3) The failover initial copy-in-progress state S602:

The failover status 780: "0" (normal initial copy-in-progress state) or "3" (automatic failback infeasible state)

The current remote copy destination storage apparatus 750 and the current remote copy destination logical volume 760: a logical volume other than the second logical volume 121

The current position in initial copy 710: completed (4) The failover state S603 (initial copy completed):

The failover status 780: "0" (normal initial copy-in-progress state) or "3" (automatic failback infeasible state)

The current remote copy destination storage apparatus 750 and the current remote copy destination logical volume 760: a logical volume other than the second logical volume 121

The current position in initial copy 710: completed (5) The failback-in-progress state S604:

The failover status 780: "1" (failback-in-progress state)

The current remote copy destination storage apparatus 750 and the current remote copy destination logical volume 760: the second logical volume 121

The current position in initial copy 710: in progress (6) The duplication failover-in-progress state S605:

The failover status 780: "2" (duplication failover-in-progress state)

The current remote copy destination storage apparatus 750 and the current remote copy destination logical volume 760: the second logical volume 121

The current position in initial copy 710: in progress

Figure 9:
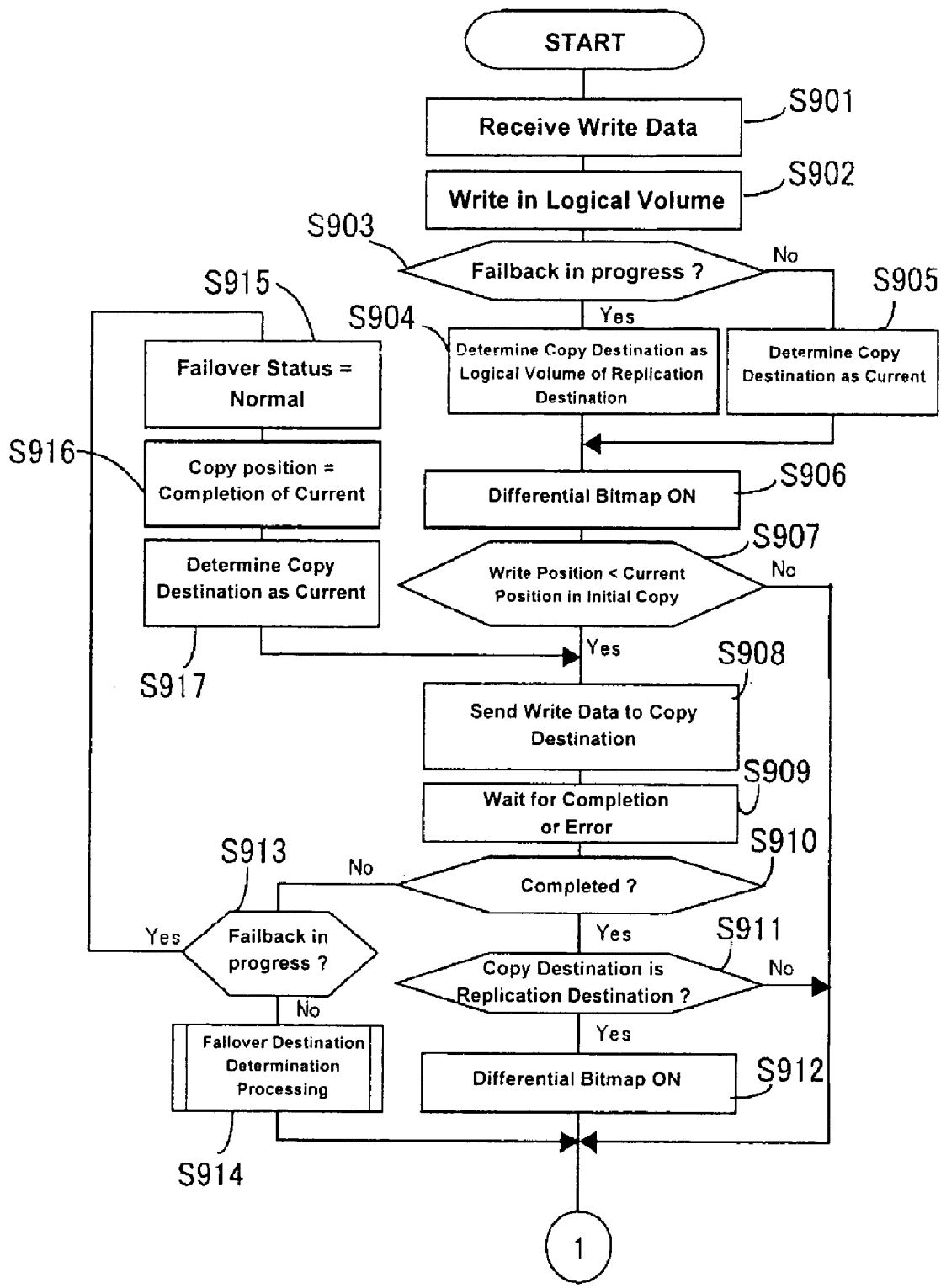
FIG. 9 shows a flowchart of a data write processing executed when a write request is sent from an information processing apparatus to a first storage apparatus according to one embodiment example of the present invention.
Figure 10:
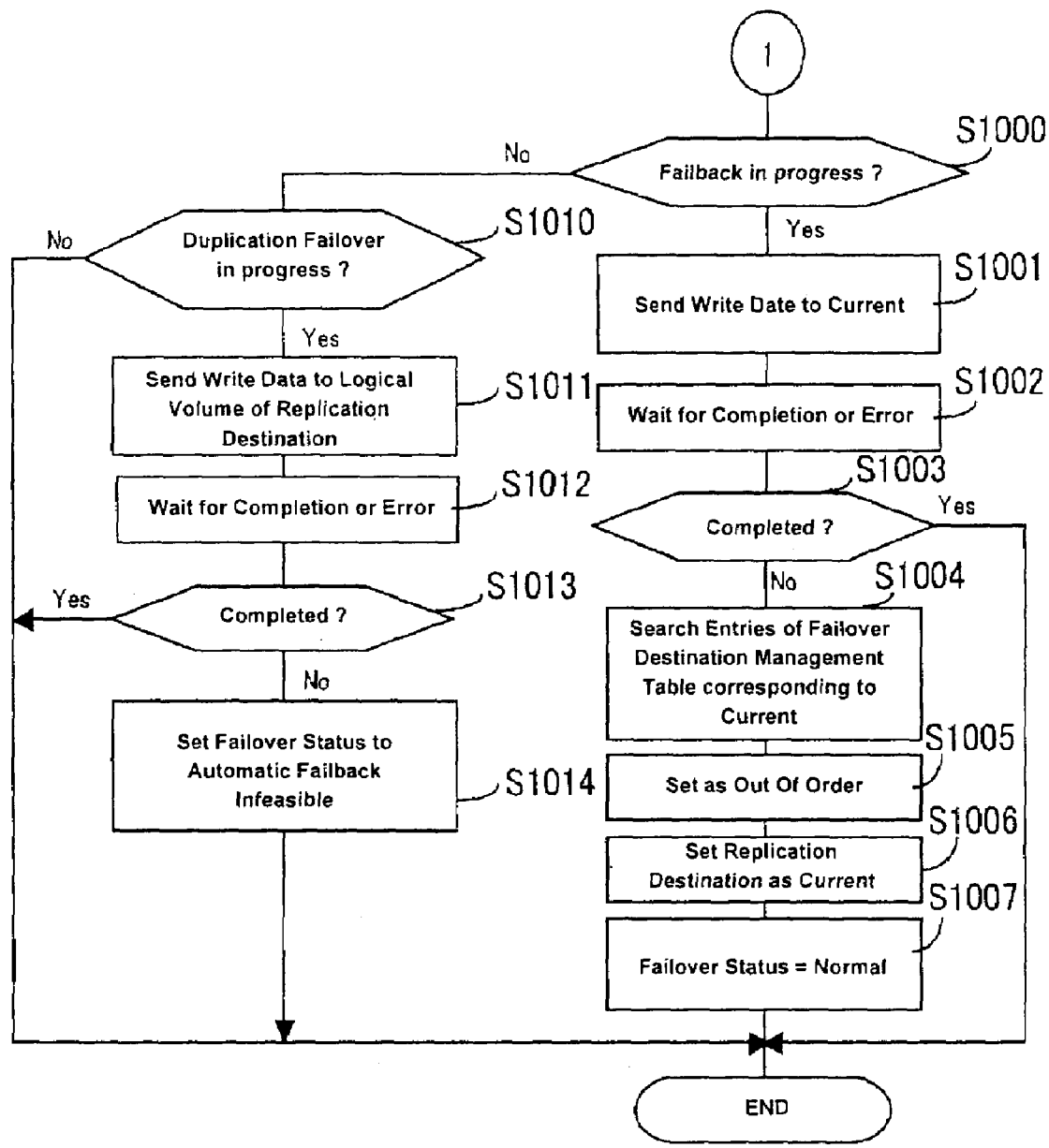
FIG. 10 shows a flowchart of a data write processing executed when a write request is sent from an information processing apparatus to a first storage apparatus according to one embodiment example of the present invention.

FIGS. 9 and 10 indicate a flowchart of a data write processing that is executed when a write request is sent from the information processing apparatus 140 to the first storage apparatus 110. In S901, the first storage apparatus 110 receives a data write request from the information processing apparatus 140. In S902, the first storage apparatus 110 writes the data to the first logical volume 111. In S903, the first storage apparatus 110 checks the failover status 780. If as a result of checking the failover status 780 is found to have a value other than "1," which indicates a failback-in-progress state, the copy destination (data replication destination) is determined as a logical volume (current) designated in the current remote copy destination storage apparatus 750 and the current remote copy destination logical volume 760, and the processing proceeds to S906.

If the failover status 780 is found to be "1," which indicates a failback-in-progress state, the copy destination is determined in S904 as the logical volume 121, which is the replication destination designated in the replication destination storage apparatus 730 and the replication destination logical volume 740.

Next, when data is copied to the logical volume 121 or 131 other than the first logical volume 111 in S906, the bit on the differential bitmap 770 that corresponds to a block of data written to the logical volume 121 or 131 is set to the on position, or "1." In S907, whether the block number whose bit is in the on position, or "1," is different from the current position in initial copy 710 (i.e., the block number<the current position in initial copy 710) is checked to determine if the initial copy is completed; if it is determined that the initial copy is completed (S907: No), the processing skips to S1000 in FIG. 10.

If it is determined in S907 that the initial copy is not completed (S907: Yes), the first storage apparatus 110 sends the write data to the storage apparatus 120 or 130 having the logical volume 121 or 131 (copy destination) determined in S904 or S905 (S908). Next, the first storage apparatus 110 waits for a copy completion report or an error report from the storage apparatus 120 or 130 to which the write data was sent (S909).

If the first storage apparatus 110 receives a copy error report in S910 (S910: No), the processing skips to S913; if the first storage apparatus 110 receives a copy completion report (S910: Yes), the processing proceeds to S911.

In S911, whether the copy destination is the replication destination logical volume is determined. If it is determined that the copy destination is not the second logical volume 121, which is the replication destination logical volume (S911: No), the processing skips to S1000; if it is determined that the copy destination is the second logical volume 121 (S911: No), the processing proceeds to S912.

In S912, the bit in the differential bitmap 770 that corresponds to the block of data written is set to the off state, or "0." This signifies that copying the data in the block ended normally. In other words, it signifies that contents of the first logical volume 111, which is the replication source logical volume, and contents of the second logical volume 121, which is the replication destination logical volume, are consistent.

In S913, whether the status is a failback-in-progress state is checked using the failover status 780. If it is determined that the status is not in a failback-in-progress state (i.e., if the failover status 780 is "0") (S913: No), a failover destination determination processing, described later, is executed and the processing skips to S1000. On the other hand, if it is determined in S913 that the status is in a failback-in-progress state (i.e., if the failover status 780 is "1") (S913: Yes), the processing proceeds to S915; in S915, the value "1" (a failback-in-progress state) in the failover status 780 is replaced by the value "0" (a normal state). In S916, the current position in initial copy 710 of the logical volume indicated by the current remote copy destination storage apparatus 750 and the current remote copy destination logical volume 760 is set to the largest block number plus 1 (i.e., the current copy position indicates completion of current remote copy); in S917, the copy destination is decided as a logical volume (current remote copy destination) indicated by the current remote copy destination storage apparatus 750 and the current remote copy destination logical volume 760, and the processing returns to S908.

In S1000, the first storage apparatus 110 checks the failover status 780 and determines whether the copy destination logical volume is in a failback-in-progress state. If it is determined in S1000 that the copy destination logical volume is not in a failback-in-progress state, or not "1" (S1000: No), the processing skips to S1010. On the other hand, if it is determined in S1000 that the copy destination logical volume is in a failback-in-progress state, or "1" (S1000: Yes), the processing proceeds to S1001. In S1001, the first storage apparatus 110 sends data to the storage apparatus 130 that has the logical volume 131, so that data can be written to the logical volume 131 (current remote copy destination) indicated by the current remote copy destination storage apparatus 750 and the current remote copy destination logical volume 760. Next, in S1002 the storage apparatus 110 waits for a copy completion report or an error report from the storage apparatus 130, to which data was sent.

In S1003, if the first storage apparatus 110 receives a completion report (S1003: Yes), the data write processing is terminated. On the other hand, if the first storage apparatus 110 receives an error report (S1003: No), the processing proceeds to S1004.

In S1004, the failover destination management table entry 810 that corresponds to the logical volume to which data could not be written is searched. In S1005, Status 840 of the failover destination management table entry 810 found is set to "1," which signifies that the corresponding logical volume is out of order. In S1006, ID numbers of the second storage apparatus 120, which is the replication destination storage apparatus, and the second logical volume 121, which is the replication destination logical volume, are set in the current remote copy destination storage apparatus 750 and the current remote copy destination logical volume 760, respectively. In S1007, the failover status 780 is set to "0," which signifies a normal state, and the data write processing is terminated.

In S1010, the first storage apparatus 110 checks the failover status 780 and determines whether the copy destination logical volume is in a duplication failover-in-progress state (i.e., whether the value is "2"). If it is determined to be in a state other than a duplication failover-in-progress state (S1010: No), the data write processing is terminated. On the other hand, if it is determined that the copy destination logical volume is in a duplication failover-in-progress state (S1010: Yes), the processing proceeds to S1011. In S1011, the first storage apparatus 110 sends the data received from the information processing apparatus 140 to the storage apparatus 120, which is the replication destination storage apparatus, so that the data can be written to the second logical volume 121, which is the replication destination logical volume. In S1012, the first storage apparatus 110 waits for a data write completion report or an error report from the storage apparatus 120, which is the replication destination storage apparatus.

If the first storage apparatus 110 receives a completion report in S1013 (S1013: Yes), the data write processing is terminated. On the other hand, if the first storage apparatus 110 receives an error report in S1013 (S1013: No), the processing proceeds to S1014. In S1014, the failover status 780 is set to automatic failback infeasible (i.e., the value of "3"), and the data write processing is terminated.

In the above processing, the data write request from the information processing apparatus 140 can be in units of single blocks or in units of a plurality of blocks.

Figure 11:
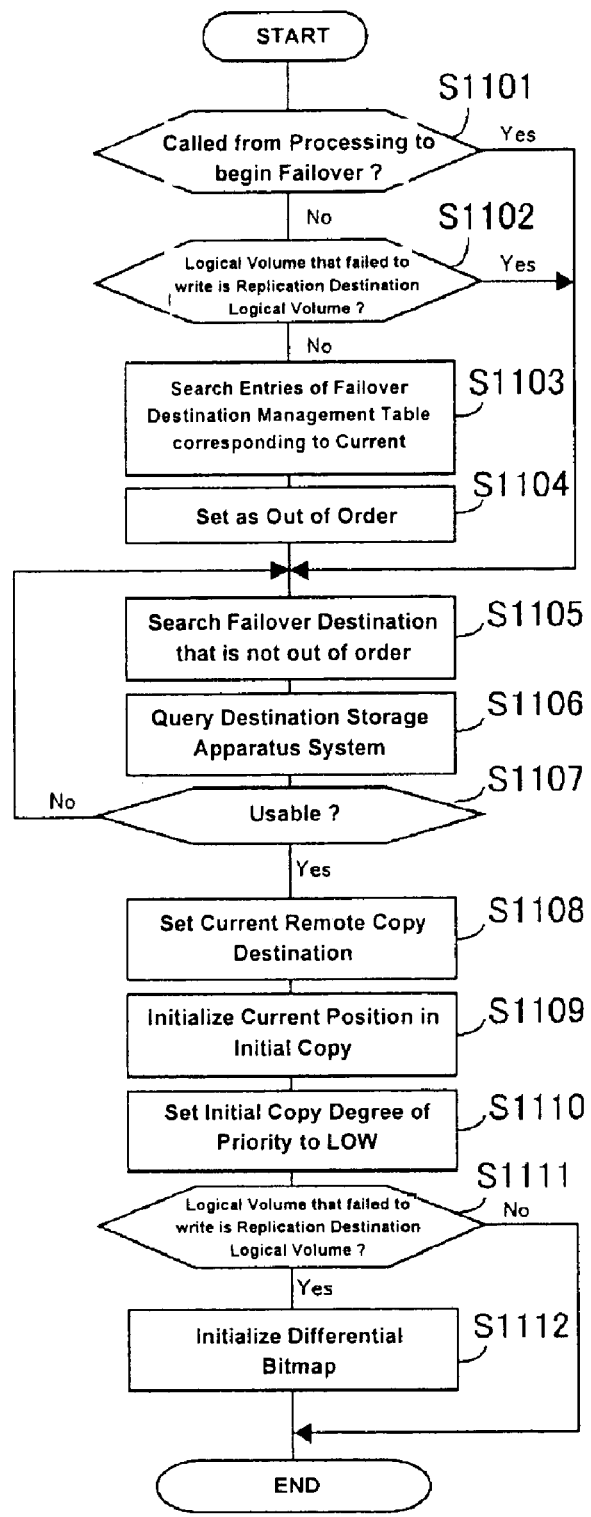
FIG. 11 shows a flowchart of a failover destination determination processing called from a data write processing or a processing to begin failover according to one embodiment example of the present invention.

FIG. 11 is a flowchart of a failover destination determination processing that is called from the data write processing (S914) or from a processing to begin failover (S1603), which is described later. First, in S1101, whether the processing is called from the processing to begin failover (S1603), described later, is determined. If it is called from the processing to begin failover (S1101: Yes), the processing skips to S1105. On the other hand, if the processing is not called from the processing to begin failover (S1101: No), the processing proceeds to S1102.

In S1102, whether the logical volume to which data could not be written is the second logical volume 121, which is the replication destination logical volume, is determined. If it is the second logical. volume 121 (S1102: Yes), the processing skips to S1105; if it is not the second logical volume 121 (S1102: No), the processing proceeds to S1103.

In S1103, the failover destination management table entry 810 that corresponds to the logical volume to which data could not be written (i.e., the current remote copy destination) is searched in the failover destination management table 800, and the corresponding Status 840 is set to "1," which signifies out of order, in S1104.

In S1105, the failover destination management table 800 is investigated and a usable logical volume (i.e., one whose value in Status 840 is "0") is searched. Next, for example, when the logical volume 131 is found, whether the logical volume 131 found in S1105 can be used is queried to the storage apparatus 130, which has the logical volume 131 (S1106).

If it is reported in S1107 that the logical volume 131 cannot be used (S1107: No), the processing returns to S1105 and searches for another entry (i.e., a logical volume). On the other hand, if it is reported in S1107 that the logical volume 131 can be used (S1107: Yes), the processing proceeds to S1108. ID numbers of the logical volume reported as usable and the storage apparatus having the logical volume are set in the current remote copy destination logical volume 760 and the current remote copy destination storage apparatus 750, respectively. Next, in S1109, the current position in initial copy 710 is set to "0," which signifies the beginning of the logical volume; and in S1110, the initial copy degree of priority 720 is set to "0," which is low.

Next, in S1111, whether the logical volume to which data could not be written (i.e., to which a remote copy could not be performed) is the second logical volume 121, which is the replication destination logical volume, is determined. If it is not the second logical volume 121 (S1111: No), the failover destination determination processing is terminated; if it is the second logical volume 121 (S1111: Yes), the processing proceeds to S1112. In S1112, only bits that correspond to blocks whose data could not be written (i.e., on which a remote copy could not be performed) are set to "1" in the differential bitmap 770, while the rest are initialized to "0," and the failover destination determination processing is terminated.

Figure 12:
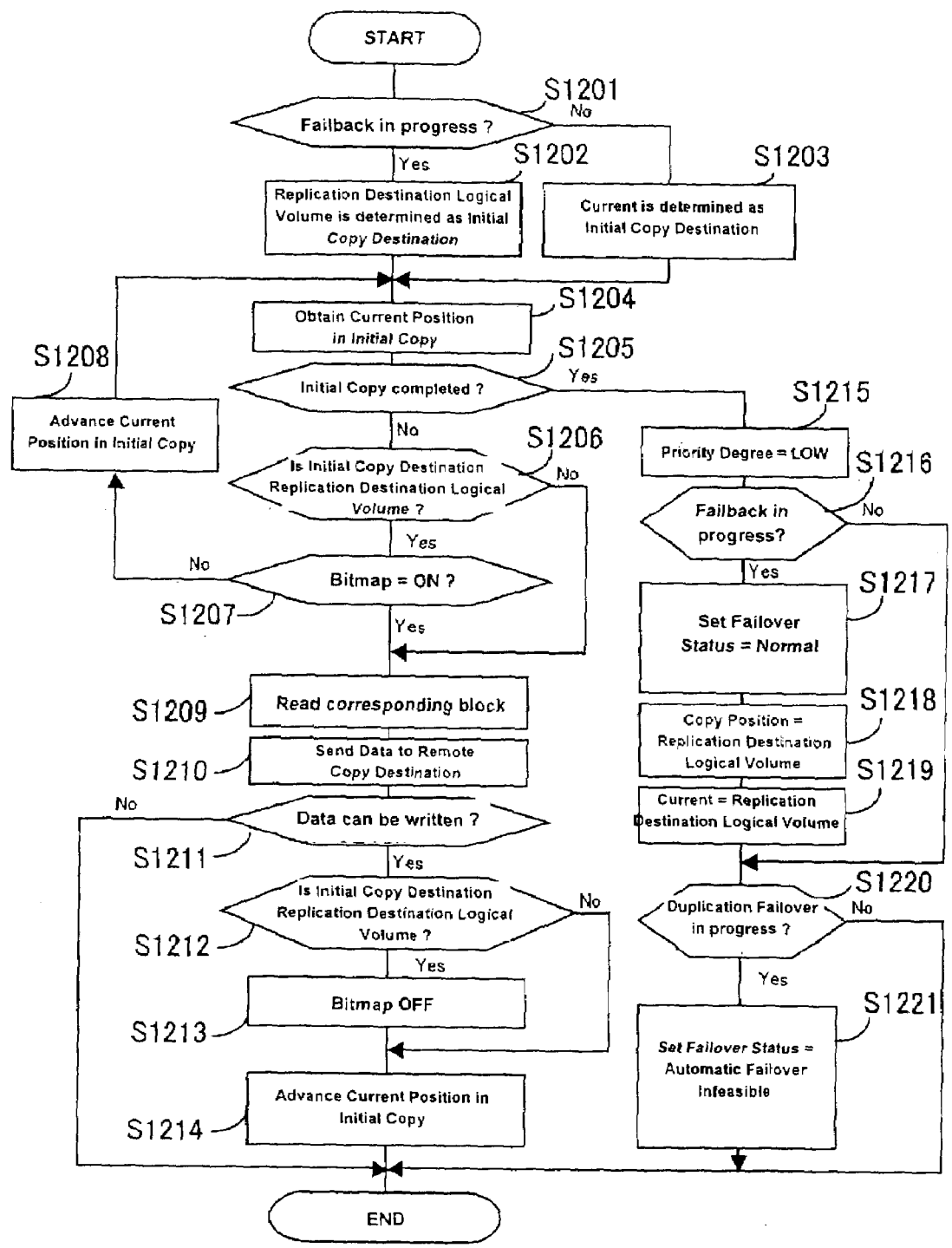
FIG. 12 shows a flowchart of an initial copy processing to make contents of a replication source logical volume and of a replication destination logical volume consistent according to one embodiment example of the present invention.

FIG. 12 shows a flowchart of an initial copy processing to make contents of the logical volume 111, which is the replication source, consistent with contents of the second logical volume 121, which is the replication destination. The initial copy processing is executed in the background asynchronously with I/O requests from the information processing apparatus 140. Further, the initial copy processing is periodically activated by the timer 207, but the activation time interval may vary depending on the value of the initial copy degree of priority 720. If the initial copy degree of priority 720 is "1," which is high, the time interval should be set to a value that would end the initial copy in a short period of time, even if this impacts response time for I/O requests from the information processing apparatus 140. For example, the value can be set to once every 10 msec. On the other hand, if the initial copy degree of priority 720 is "0," which is low, the time interval should be set to a value that would have almost no impact on the response time for I/O requests from the information processing apparatus 140. For example, the value can be set to once every second.

First, in S1201, the failover status 780 is referred to, and whether a failback is in progress is determined. If it is determined in S 1201 that a failback is not in progress, or not "1" (S1201: No), the processing proceeds to S1203. In S1203, the logical volume 131, which is designated by the current remote copy destination storage apparatus 750 and the current remote copy destination logical volume 760, is determined as the initial copy destination, and the processing proceeds to S1204. On the other hand, if it is determined in S1201 that a failback is in progress, or "1" (S1201: Yes), the processing proceeds to S1202; in S1202, the initial copy destination is determined as the second logical volume 121, which is the replication destination logical volume, and the processing proceeds to S1204.

The current position in initial copy 710 is obtained in S1204, and whether the initial copy is completed is determined in S1205. If it is determined in S1205 that the initial copy is completed (i.e., when the value of the current position in initial copy 710 equals the largest block number of the logical volume, which is the initial copy destination, plus 1) (S1205: Yes), the processing skips to S1215. On the other hand, if it is determined in S1205 that the initial copy is still in progress (S1205: No), the processing proceeds to S1206.

In S1206, whether the initial copy destination is the replication destination logical volume, which is the second logical volume 121, is determined; if it is determined that it is not the replication destination logical volume (S1206: No), the processing skips to S1209. On the other hand, if it is determined that it is the replication destination logical volume (S1206: Yes), the processing proceeds to S1207.

In S1207, whether the bit on the differential bitmap 770 that corresponds to the block number on which the initial copy is to take place is in the on state, or "1," is determined; if it is determined that it is in the on state, or "1" (S1207: Yes), the processing proceeds to S1209; if it is determined that it is in the off state, or "0" (S1207: No), the processing proceeds to S1208, where the current position in initial copy 710 is incremented by one and the processing returns to S1204.

In S1209, the block on which to perform the initial copy is read from the first logical volume 111. Next, in S1210, data in the block on which the initial copy is to be performed is sent to the storage apparatus (i.e., the remote copy destination) that has the logical volume, which is the initial copy destination, to be written.

In S1211, whether data can be written in the initial copy is determined; if it is determined that data can be written (S1211: Yes), the processing proceeds to S1212; if it is determined that data cannot be written (S1211: No), the initial copy processing is terminated.

If data cannot be written, a failover can either be executed or not executed. If a failover is not executed, an initial copy processing is retried by the timer 207 on the logical volume to which the initial copy failed.

In S1212, whether the logical volume that is the initial copy destination is the second logical volume 121, which is the replication destination, is determined; if it is determined that it is not the second logical volume 121 (S1212: No), the processing skips to S1214; if it is determined that it is the second logical volume 121 (S1212: Yes), the bit on the differential bitmap 770 that corresponds to the block number on which the initial copy is to take place is set to the off state, or "0" (S1213), and the processing proceeds to S1214.

In S1214, the current position in initial copy 710 is incremented by one and the initial copy processing is terminated.

In S1215, the initial copy degree of priority is set to "0," which is low. The failover status 780 is referred to in S1216 and whether a failback is in progress is checked. If it is determined in S1216 that a failover status 780 is in a state other than a failback-in-progress state, or not "1" (S1216: No), the processing proceeds to S1220. On the other hand, if it is determined in S1216 that it is in a failback-in-progress state, or "1," the processing proceeds to S1217, where the failover status 780 is set to a normal state, or "0." Next, in S1218, the current position in initial copy 710 is set to the largest block number of the logical volume, which is the initial copy destination, plus 1. Next, in S1219, ID numbers of the storage apparatus 120, which is the replication destination storage apparatus, and the logical volume 121, which is the replication destination logical volume, are set in the current remote copy destination storage apparatus 750 and the current remote copy destination logical volume 760, respectively, and the processing proceeds to S1220.

In S1220, whether the failover status 780 indicates a duplication failover-in-progress state, or "2," is determined; if it is determined to indicate a duplication failover-in-progress state (S1220: Yes), the processing proceeds to S1221, where the failover status 780 is set to an automatic failback infeasible state, or "3," and the initial copy processing is terminated. On the other hand, if it is determined in S1220 that the failover status 780 does not indicate a duplication failover-in-progress state (S1220: No), the initial copy processing is terminated.

Figure 13:
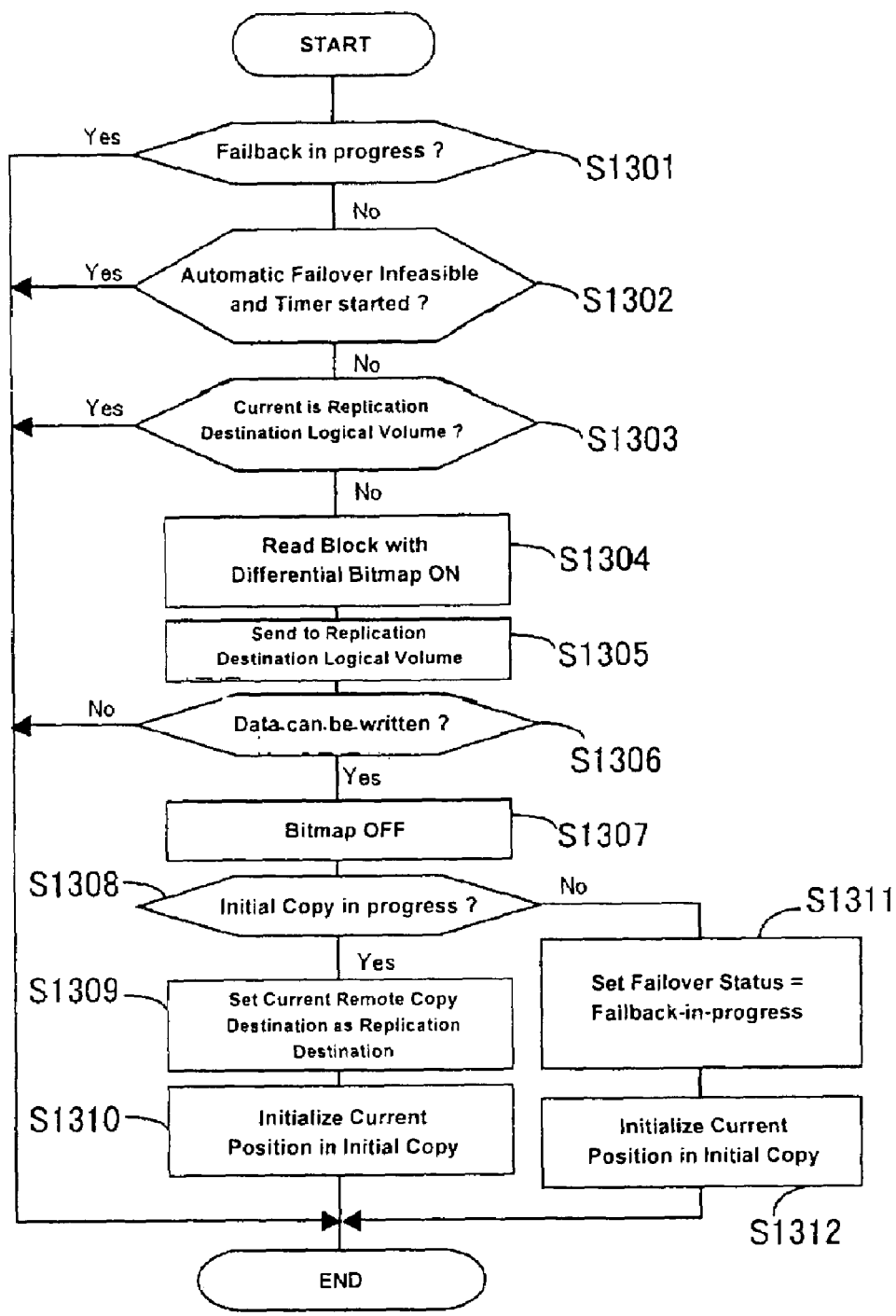
FIG. 13 shows a flowchart of a failback determination processing to determine whether access (data write) to a second logical volume is possible during a failover and to begin a failback according to one embodiment example of the present invention.

FIG. 13 is a flowchart of a failback determination processing to determine whether an access (i.e., data write) to the second logical volume 121 is possible during a failover, and to begin a failback. The failback determination processing is activated by a system administrator or periodically by the timer 207. For example, if the failback determination processing is set to be periodically activated once every minute, the timer 207 instructs the first storage apparatus 110 to activate the failback determination processing once every minute.

First, the failover status 780 is referred to in S1301 to determine whether a failback is already in progress. If as a result of the determination made in S1301, it is determined that a failback is in progress, or "1" (S1301: Yes), the failback determination processing is terminated.

If as a result of the determination made in S1301, it is determined that a failback is not in progress, or not "1" (S1301: No), the processing proceeds to S1302. In S1302, whether the failover status 780 is set to an automatic failback infeasible state, or "3," and whether the current failback determination processing has been activated by the timer 207 are determined. If as a result of the determination made in S1302, it is determined that the failover status 780 is set to the automatic failback infeasible state, or "3," and that the current failback determination processing has been activated by the timer 207 (S1302: Yes), the failback determination processing is terminated; otherwise, the processing proceeds to S1303.

In S1303, whether the logical volume designated by the current remote copy destination storage apparatus 750 and the current remote copy destination logical volume 760 is the second logical volume 121, which is the replication destination logical volume, is determined. If it is determined in S1303 that it is the second logical volume 121 (S1303: Yes), the failback determination processing is terminated. On the other hand, if it is determined in S1303 that it is not the second logical volume 121 (S1303: No), the processing proceeds to S1304; in S1304, a block with the smallest block number among blocks whose bits are 1 in the differential bitmap 770 is selected, and the block is read from the first logical volume 111. In S1305, data in the block is sent to the second storage apparatus 120, which is the replication destination storage apparatus that has the second logical volume 121, which is the replication destination logical volume, to be written to the second logical volume 121.

In S1306, whether data can be written to the second logical volume 121, which is the replication destination logical volume, is determined. If it is determined in S1306 that data cannot be written (S1306: No), a failback is determined to be infeasible and the failback determination processing is terminated. On the other hand, if it is determined in S1306 that data can be written to the second logical volume 121, which is the replication destination logical volume (S 1306: Yes), it is determined that a failback is feasible and the processing proceeds to S1307. In S1307, the bit that corresponds to the block in the differential map 770 is set to the off state, or "0," and the processing proceeds to S1308.

In S1308, the current position in initial copy 710 is investigated and whether an initial copy is currently in progress is determined. If it is determined in S1308 that the initial copy is completed (i.e., when the value of the current position in initial copy 710 equals the largest block number of the logical volume plus 1) (S1308: No), the processing skips to S1311. On the other hand, if it is determined in S1308 that the initial copy is still in progress (S1308: Yes), ID numbers of the storage apparatus 120 and the second logical volume 121, which are the replication destination, are set in the current remote copy destination storage apparatus 750 and the current remote copy destination logical volume 760, respectively. In S1310, the current position in initial copy 710 is initialized to "0," which signifies the beginning of the logical volume, and the failback determination processing is terminated In S1311, the failover status 780 is set to a failback-in-progress state, or "1"; and in S1312, the current position in initial copy 710 is initialized to "0," which signifies the beginning of the logical volume, and the failback determination processing is terminated.

As described above, a failback is determined to be feasible if a data write is successful once according to the present embodiment example, but a failback may be determined to be feasible based on other criteria. For example, a failback can be determined to be feasible if data write is successful consecutively a certain number of times.

Furthermore, according to the present embodiment example, a failback processing takes place when it is determined that a failback is feasible to the second logical volume 121. In this case, a determination may be made as to whether an initial copy processing in order to failback to the second logical volume 121 or an initial copy processing in order to failover to the third logical volume 131 should take place first. For example, by determining whether it would require less time for an initial copy for a failback to the second logical volume 121 or for a failover to the third logical volume 131 (for example, this determination can be made by comparing the number of blocks that must be transferred for initial copy), the one that requires less time for initial copy can be selected. This can further shorten the time during which redundancy of the logical volume 111 is not guaranteed.

Figure 14:
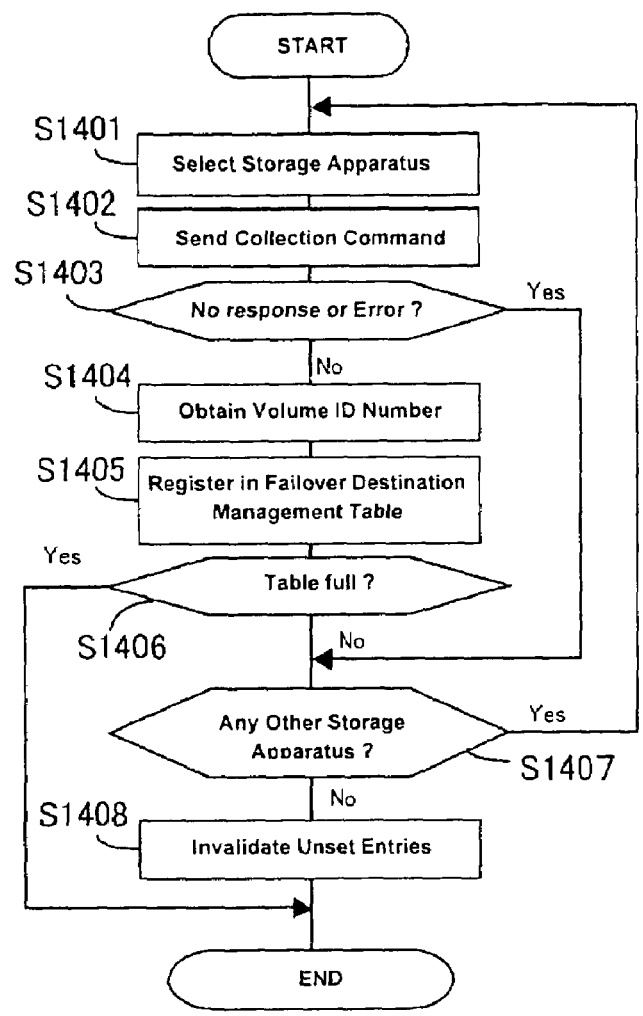
FIG. 14 shows a flowchart of a failover destination collection processing activated by a timer.

FIG. 14 is a flowchart of a failover destination collection processing that is activated once every 24 hours by the timer 207. The failover destination collection processing can alternatively be set to collect failover destinations when a failover becomes necessary.

First, in S1401, one of the spare storage apparatuses connected to the first storage apparatus 110 via the networks 150 is selected, and the processing proceeds to S1402. To be able to make this selection, the first storage apparatus 110 may have a list in advance of all spare storage apparatuses connected via the networks 150, or it may create a list of all storage apparatuses when it becomes necessary by broadcasting via the networks 150 and obtaining responses from spare storage apparatuses currently connected.

In S1402, a "collection command" is sent to the spare storage apparatus selected. The spare storage apparatus that received the collection command executes a processing to declare spare logical volumes, described later, and sends back a list of spare logical volumes (i.e., logical volumes usable as failover destinations) provided on the spare storage apparatus. However, if a failure has occurred on the spare storage apparatus that received the collection command, it cannot respond to the first storage apparatus 110. Furthermore, if the storage apparatus that received the collection command does not have any spare logical volumes, an error message is sent to the first storage apparatus 110.

In S1403, whether there was no response or an error message in response to the collection command is determined; if it is determined that there was no response or an error message (S1403: Yes), the processing skips to S1407. On the other hand, if there was a response from the spare storage apparatus (S1403: No), the processing proceeds to S1404.

In S1404, ID numbers of logical volumes are obtained from the list of spare logical volumes. In S1405, the ID numbers are registered in the failover destination management table 800. At the same time, the ID number of the spare storage apparatus selected is set in Storage Apparatus 820, each of the ID numbers of the logical volumes on the list received is set in Logical Volume 830, and the value "0" that signifies that the logical volume indicated in Logical Volume 830 is not out of order is set in Status 840. If the failover destination management table 800 becomes full, the failover destination collection processing is terminated (S1406: Yes). On the other hand, if it is determined in S1406 that the failover destination management table 800 is not full (S1406: No), the processing proceeds to S1407.

In S1407, whether there are any spare storage apparatuses that have not yet been selected is determined. If it is determined in S1407 that there are spare storage apparatuses that have not yet been selected (S1407: Yes), the processing returns to S1401. If it is determined in S1407 that there are no spare storage apparatuses that have not yet been selected (S1407: No), the processing proceeds to S1408. In S1408, a value "2," which signifies that the corresponding entry 810 is invalid, is set in Status 840 of the entries 810 for any of the spare logical volumes whose entry 810 has not been set.

The logical volumes to which a failover is feasible are specified through the failover destination collection processing. Consequently, when data cannot be written to the second logical volume 121 or the third logical volume 131, the processing that was being performed (for example, an initial copy or remote copy) on the second logical volume 121 or the third logical volume 131 can be quickly taken over by another logical volume to which a failover is feasible.

Figure 15:
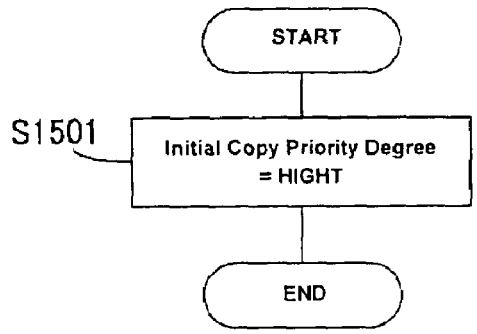
FIG. 15 shows a flowchart of a processing for a system administrator to raise initial copy degree of priority according to one embodiment example of the present invention.

FIG. 15 is a flowchart of a processing for a system administrator to raise the initial copy degree of priority 720.

First, the system administrator activates this processing in order to raise the initial copy degree of priority 720. When the initial copy degree of priority 720 is set to "1," which is high, in S1501, the processing to increase the initial copy degree of priority is terminated. Similarly, a processing can be designed to allow the system administrator to activate a processing to lower the initial copy degree of priority 720.

Figure 16:
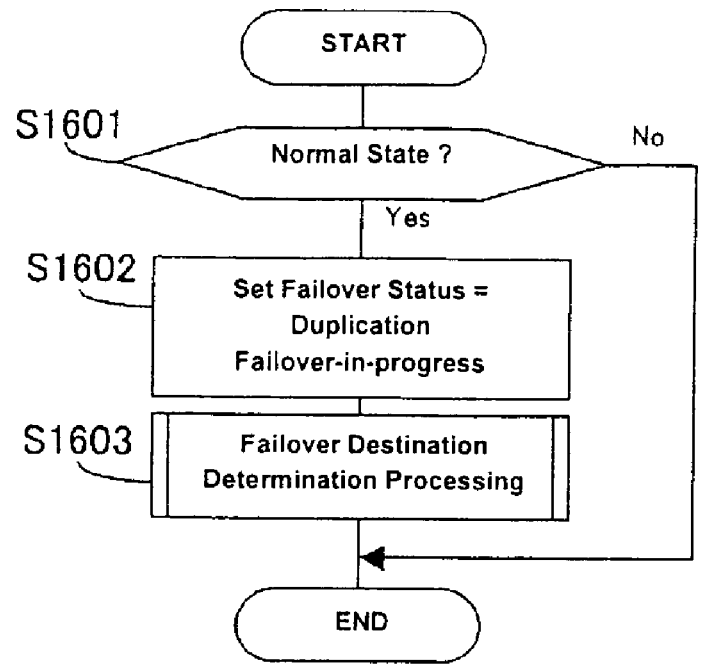
FIG. 16 shows a flowchart of a processing to begin failover that a system administrator activates to request an execution of a failover according to one embodiment example of the present invention.

FIG. 16 is a flowchart of a processing to begin failover that is activated by a system administrator to request an execution of a failover.

First, in S1601, whether the status is in the normal state S601 is determined. For the normal state S601 to be established, the failover status 780 is set to the normal status, or "0"; the current remote copy destination storage apparatus 750 and the current remote copy destination logical volume 760 must indicate the second storage apparatus 120 and the second logical volume 121, respectively; and the current position in initial copy 710 must be the largest block number in the second logical volume 121 plus 1. If as a result of the determination made in S1601, it is determined that the status is the normal state S601 (S1601: Yes), the processing proceeds to S1602; if it is determined that the status is not the normal state S601 (S1601: No), the processing to begin failover is terminated. In S1602, the failover status 780 is set to the duplication failover-in-progress state, or "2"; the failover destination determination processing is executed in step S1603, and the processing to begin failover is terminated.

Figure 17:
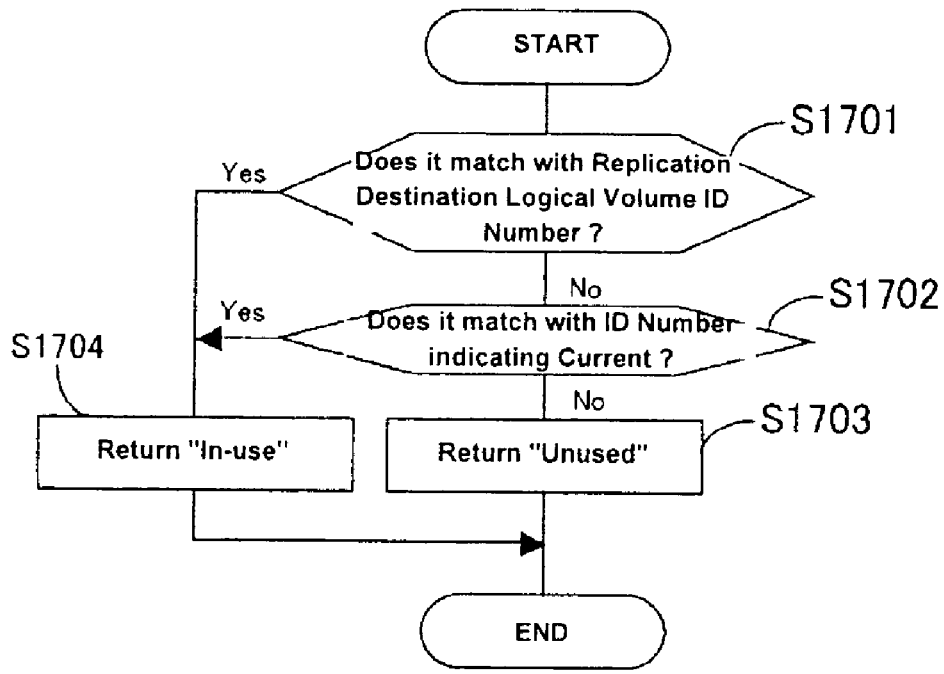
FIG. 17 shows a flowchart of a processing executed in a first storage apparatus to check the usage status of logical volumes provided on storage apparatuses other than the first storage apparatus when a storage apparatus other than the first storage apparatus queries the usage status of such logical volumes, according to one embodiment example of the present invention.

FIG. 17 is a flowchart of a processing executed in the first storage apparatus 110 to check the usage status of the logical volume 121 or 131, when a storage apparatus other than the first storage apparatus 110 queries the usage status of the logical volume 121 or 131, which is provided on the storage apparatus 120 or 130 other than the first storage apparatus 110, in S2103 of an update processing for the spare volume management table 850, described later.

First, in S1701 whether the ID number of the spare logical volume queried matches the ID number of the second logical volume 121, which is set as the replication destination logical volume, is determined; if they are determined to match (S1701: Yes), the processing skips to S1704; if they are determined not to match (S1701: No), the processing proceeds to S1702.

In S1702, whether the ID number of the spare logical volume queried matches with the logical volume designated by the current remote copy destination storage apparatus 750 and the current remote copy destination logical volume 760 is determined; if they are determined to match (S1702: Yes), the processing skips to S1704; if they are determined not to match (S1702: No), the processing proceeds to S1703; in S1703, a response that the logical volume queried is "unused" is sent back to the storage apparatus that made the query, and the usage status check processing is terminated. In S1704, a response that the logical volume queried is "in use" is sent back to the storage apparatus that made the query, and the usage status check processing is terminated.

Various processing executed in the first storage apparatus 110 have been described above, but the following processings are executed in the second storage apparatus 120 or the third storage apparatus 130.

Figure 18:
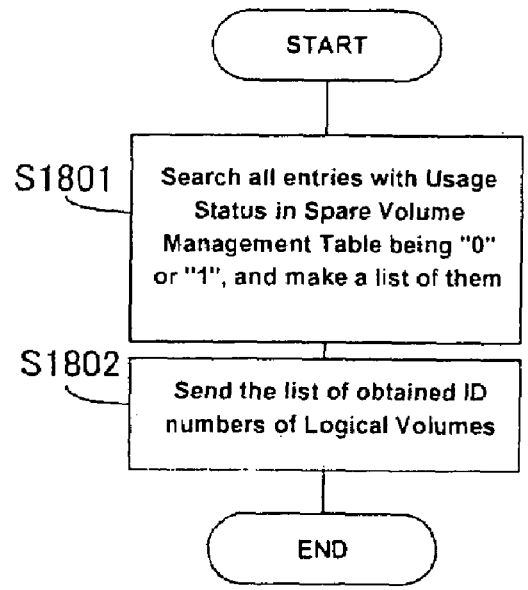
FIG. 18 shows a flowchart of a processing to declare spare logical volumes according to one embodiment example of the present invention.

FIG. 18 is a flowchart of a processing to declare spare logical volumes, which is activated upon receipt of the collection command.

First, in S1801, all entries 860 whose value in Usage Status 870 is "0" (free) or "1" (in use as a spare logical volume) are searched in the spare volume management table 850 and a list of ID numbers of applicable logical volumes is created. In S1802, the list created is sent to the first storage apparatus 110 that sent the collection command, and the processing to declare spare logical volumes is terminated.

Figure 19:
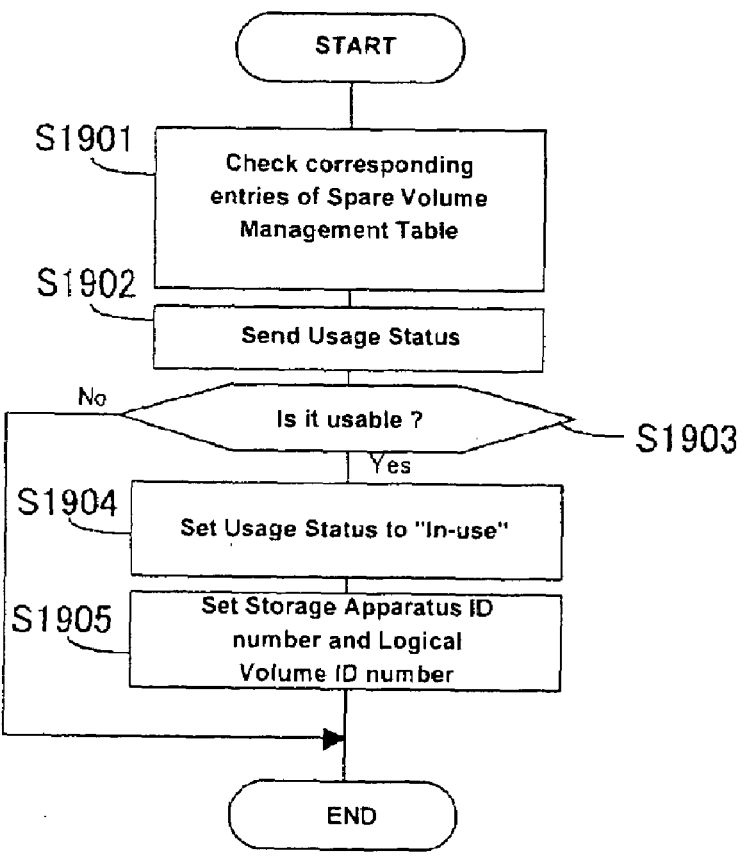
FIG. 19 shows a flowchart of a processing to report the usage status of spare logical volumes according to one embodiment example of the present invention.

FIG. 19 is a flowchart of a processing to report usage status of spare logical volumes, which is activated by a query made in S1106 of the failover destination determination processing.

First, the first storage apparatus 110 queries the usage status of a logical volume whose value in Usage Status 870 is other than "2" (which signifies invalid) and that is designated by ID numbers in Storage Apparatus 880 and Logical Volume 890. Based on the query, in S1910, the applicable spare storage apparatus searches for a logical volume that satisfies the conditions from among the entries 860 in the spare volume management table 850. In S1902, the value of Usage Status 870 of the entry 860 found is sent to the first storage apparatus 110, and the processing proceeds to S1903.

In S1903, if the value of Usage Status 870 of the entry 860 found is not "0," which signifies that the corresponding logical volume is free (S1903: No), the processing to report usage status of spare logical volumes is terminated. On the other hand, if the value of Usage Status 870 is "0," which signifies that the corresponding logical volume is free (S1903: Yes), the processing proceeds to S1904.

In S1904, Usage Status 870 is set to "1," which signifies that the corresponding logical volume is in use. Next, in S1905, the ID number of the corresponding logical volume and the ID number of the storage apparatus having the logical volume are registered in Logical Volume 890 and Storage Apparatus 880, respectively, of the corresponding spare volume management table entry 860. Next, the processing to report usage status of spare logical volumes is terminated.

Figure 20:
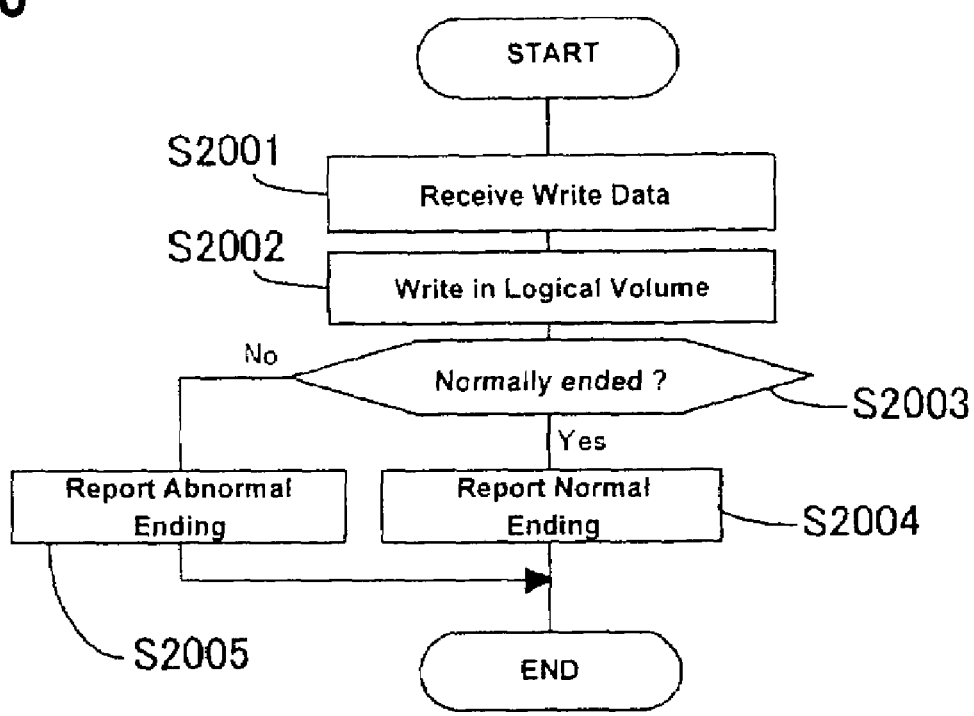
FIG. 20 shows a flowchart of a remote write processing executed when there is a data write (remote copy) request from a first storage apparatus to a first logical volume according to one embodiment example of the present invention.

FIG. 20 is a flowchart of a remote write processing that is executed when there is a data write (remote copy) request from the first storage apparatus 110 to write data in the first storage volume 111. Specifically, a data write (remote copy) request to the first storage apparatus 110 is issued in S908 and S1001 of the data write processing, in S1210 of the initial copy processing, and in S1305 of the failback determination processing.

First, in S2001, the second storage apparatus 120 or the third storage apparatus 130 receives data to be written via the network 115; and in S2002, the data is written to the second logical volume 121 or the third logical volume 131. In S2003, the second storage apparatus 120 or the third storage apparatus 130 determines whether the data write has ended normally. If it is determined in S2003 that it ended normally (S2003: Yes), the processing proceeds to S2004. Next, in S2004, the second storage apparatus 120 or the third storage apparatus 130 reports to the first storage apparatus 110, which requested the remote copy, that the data write has ended normally, and terminates the remote write processing.

On the other hand, if it is determined in S2003 that data cannot be written (S2003: No) in either the second or third storage apparatus 120 or 130, the processing proceeds to S2005. In S2005, the second storage apparatus 120 or the third storage apparatus 130 reports to the first storage apparatus 110, which requested the remote copy, that the data write has ended abnormally, and the remote write processing is terminated.

Figure 21:
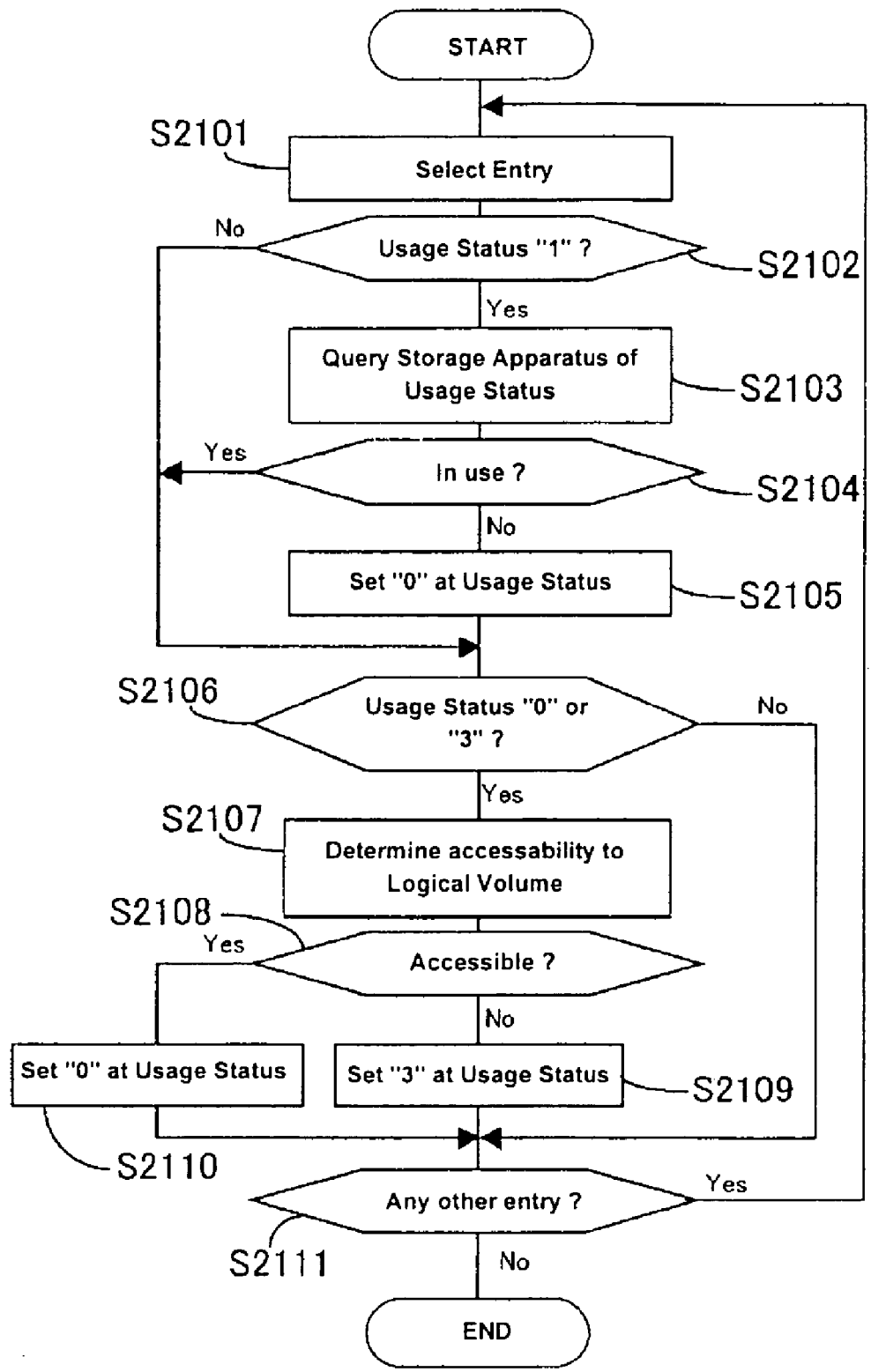
FIG. 21 shows a flowchart of an update processing for a spare volume management table, which is activated by a timer, according to one embodiment example of the present invention.

FIG. 21 is a flowchart of an update processing for the spare volume management table 850, which is activated once every six hours by the timer 207. This processing is performed by each of the storage apparatuses 120 and 130 to periodically manage the usage status of their respective logical volumes and to update their respective spare volume management table 850.

First, in S2101, one of the entries 860 is selected from the spare volume management table 850. In S2102, the usage status of the entry 860 is checked; if it is determined that the usage status has a value other than "1" (i.e., the corresponding logical volume is in use as a spare logical volume) (S2102: No), the processing skips to S2106.

If as a result of checking the usage status of the entry 860 in S2102 the value is determined to be "1" (S2102: Yes), the processing proceeds to S2103. In S2103, the first storage apparatus 110 designates the ID number of Logical Volume 890 provided on the storage apparatus indicated by the ID number in Storage Apparatus 880, and queries the storage apparatus of the usage status of the logical volume designated.

In S2104, if a response that the logical volume is "in use" is sent to the first storage apparatus 110 (S2104: Yes), the processing skips to S2106. On the other hand, if the response is that the logical volume is "unused" (S2104: No), the processing proceeds to S2105. In S2105, Usage Status 870 is set to "0" (free, signifying that the logical volume is usable as a spare logical volume) and the processing proceeds to S2106.

In S2106, whether the value of Usage Status 870 is "0" (free, signifying that the logical volume is usable as a spare logical volume) or "3" (signifying that the logical volume is out of order) is determined; if as a result of the determination the value of Usage Status 870 is found to be other than "0" or "3" (S2106: No), the processing skips to S2111. On the other hand, if as a result of the determination the value of Usage Status 870 is found to be "0" or "3" (S2106: Yes), the processing proceeds to S2107. In S2107, whether access can be made to the spare logical volume is determined. This determination can be based on, for example, an I/O request issued to the spare logical volume, where a determination of "access feasible" is made when the processing ends abnormally, while a determination of "access infeasible" is made when the processing does not end normally.

If it is determined in S2108 that access is feasible (S2108: Yes), the processing proceeds to S2110. In S2110, the value of Usage Status 870 is set to "0" (free), and the processing proceeds to S2111. On the other hand, if it is determined in S2108 that access is infeasible (S2108: No), the processing proceeds to S2109. In S2109, the value of Usage Status 870 is set to "3" (out of order), and the processing proceeds to S2111.

In S2111, whether there are any more entries 860 left is determined; if as a result of the determination more entries are found to be remaining (S2111: Yes), the processing returns to S2101; if as a result of the determination no more entries are found to be remaining (S2111: No), the update processing for the spare volume management table 850 is terminated.

Although candidates of failover destination spare logical volumes are automatically selected through the failover destination collection processing according to the present embodiment example, an administrator may manually set the failover destination management table 800 in advance and decide on a failover destination spare logical volume using the failover destination management table 800.

This concludes the description of the embodiments, but the embodiment examples serve only to facilitate the understanding of the present invention and do not limit the interpretation of the present invention. Many modifications can be made without departing from the present invention, and the present invention includes equivalents derived therefrom.

As described above, a control method for an information processing system and an information processing system can be provided according to the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for controlling an information processing system essentially composed of a first storage apparatus equipped with a first logical volume, a second storage apparatus equipped with a second logical volume, a third storage apparatus equipped with a third logical volume, an information processing apparatus that accesses the first storage apparatus, a first communication module that communicatively connects the first storage apparatus with the second storage apparatus, and a second communication module that communicatively connects the first storage apparatus with the third storage apparatus, the method comprising the steps of:

executing a replication management processing from the first logical volume to the second logical volume, wherein, upon receiving a data write request from the information processing apparatus, the first storage apparatus stores data in the first logical volume according to the data write request and also sends the data to the second storage apparatus, and upon receiving the data, the second storage apparatus stores the data in the second logical volume;

executing a replication management processing from the first logical volume to the third logical volume, wherein, upon receiving a request to execute a failover from the information processing apparatus, the first storage apparatus sends the data to the third storage apparatus, and upon receiving the data, the third storage apparatus stores the data in the third logical volume;

executing an initializing replication processing from the first logical volume to the second logical volume, when a content of the first logical volume is not consistent with a content of the second logical volume; and executing an initializing replication processing from the first logical volume to the third logical volume, when a content of the first logical volume is not consistent with a content of the third logical volume, wherein the first storage apparatus sends all data of the first logical volume to the second storage apparatus prior to executing the replication management processing from the first logical volume to the second logical volume, and, the second storage apparatus stores in the second logical volume all the data of the first logical volume to make the content of the second logical volume consistent with the content of the first logical volume.

2. A method for controlling an information processing system according to claim 1, wherein, when the data cannot be written in the third logical volume during executing the replication management processing from the first logical volume to the third logical volume, the initializing replication processing from the first logical volume to the second logical volume is automatically started.

3. A method for controlling an information processing system according to claim 2, further comprising the step of automatically starting an initializing replication processing from the first logical volume to a fourth logical volume of a fourth storage apparatus, when the data cannot be written in the second logical volume during executing the initializing replication processing from the first logical volume to the second logical volume, wherein the first storage apparatus sends the data to the fourth storage apparatus, and the fourth storage apparatus stores the data in the fourth logical volume.

4. A method for controlling an information processing system according to claim 3, wherein the initializing replication processing from the first logical volume to the fourth logical volume is automatically started, when the data cannot be written in the second logical volume, the first storage apparatus queries the fourth storage apparatus about a usage status of the fourth logical volume, and the first storage apparatus receives a notification from the fourth storage apparatus indicating that the fourth logical volume is usable.

5. A method for controlling an information processing system according to claim 2, wherein the replication management processing from the first logical volume to the second logical volume starts after completing the initializing replication processing from the first logical volume to the second logical volume.

6. A method for controlling an information processing system according to claim 2, further comprising the steps of:
   judging whether or not data can be written in the third logical volume during executing the initializing replication processing from the first logical volume to the second logical volume; and
   starting a re-initializing replication processing, when a determination is made that data can be written in the third logical volume, wherein the first storage apparatus sends all data of the first logical volume to the third storage apparatus, and the third storage apparatus stores in the third logical volume all the data of the first logical volume.

7. A method for controlling an information processing system according to claim 6, wherein the step of judging whether or not data can be written in the third logical volume includes the step of judging whether or not data can be written twice consecutively in the third logical volume.

8. A method for controlling an information processing system according to claim 6, further comprising a selection step of selecting one of the initializing replication processing from the first logical volume to the second logical volume and the re-initializing replication processing from the first logical volume to the third logical volume to be executed first.

9. A method for controlling an information processing system according to claim 8, wherein the selection step includes the steps of comparing a time period required for the initializing replication processing from the first logical volume to the second logical volume with a time period required for the re-initializing replication processing from the first logical volume to the third logical volume, judging which one of the time periods is shorter, and executing the selection step based on a judgment result provided by the step of judging.

10. A method for controlling an information processing system according to claim 6, further comprising the step of starting the replication management processing from the first logical volume to the third logical volume after completing the re-initializing replication processing from the first logical volume to the third logical volume.

11. A method for controlling an information processing system essentially composed of a first storage apparatus equipped with a first logical volume, a second storage apparatus equipped with a second logical volume, a third storage apparatus equipped with a third logical volume, an information processing apparatus that accesses the first storage apparatus, a first communication module that communicatively connects the first storage apparatus with the second storage apparatus, and a second communication module that communicatively connects the first storage apparatus with the third storage apparatus, the method comprising the steps of:
   executing a replication management processing from the first logical volume to the second logical volume, wherein, upon receiving a data write request from the information Processing apparatus, the first storage apparatus stores data in the first logical volume according to the data write request and also sends the data to the second storage apparatus, and upon receiving the data, the second storage apparatus stores the data in the second logical volume;
   executing a replication management processing from the first logical volume to the third logical volume, wherein, upon receiving a request to execute a failover from the information processing apparatus, the first storage apparatus sends the data to the third storage apparatus, and upon receiving the data, the third storage apparatus stores the data in the third logical volume;
   executing an initializing replication processing from the first logical volume to the second logical volume, when a content of the first logical volume is not consistent with a content of the second logical volume; and
   executing an initializing replication processing from the first logical volume to the third logical volume, when a content of the first logical volume is not consistent with a content of the third logical volume,
   wherein the first storage apparatus sends all data of the first logical volume to the third storage apparatus prior to executing the replication management processing from the first logical volume to the third logical volume, and the third storage apparatus stores in the third logical volume all the data of the first logical volume to make the content of the third logical volume consistent with the content of the first logical volume.

12. A method for controlling an information processing system according to claim 11, wherein, when the data cannot be written in the second logical volume during executing the initializing replication processing from the first logical volume to the third logical volume, the initializing replication processing from the first logical volume to the third logical volume is continued.

13. A method for controlling an information processing system according to claim 12, further comprising the step of automatically starting an initializing replication processing from the first logical volume to a fourth logical volume of a fourth storage apparatus, when the data cannot be written in the third logical volume during executing the initializing replication processing from the first logical volume to the third logical volume, wherein the first storage apparatus sends the data to the fourth storage apparatus, and the fourth storage apparatus stores the data in the fourth logical volume.

14. A method for controlling an information processing system according to claim 12, wherein the replication management processing from the first logical volume to the third logical volume starts after completing the initializing replication processing from the first logical volume to the third logical volume.

15. A method for controlling an information processing system according to claim 12, further comprising the steps of:
   judging whether or not data can be written in the second logical volume during executing the initializing replication processing from the first logical volume to the third logical volume; and
   starting a re-initializing replication processing, when a determination is made that data can be written in the second logical volume, wherein the first storage apparatus sends all data of the first logical volume to the second storage apparatus, and the second storage apparatus stores in the second logical volume all the data of the first logical volume.

16. A method for controlling an information processing system according to claim 15, wherein the step of judging whether or not data can be written in the second logical volume includes the step of judging whether or not data can be written twice consecutively in the second logical volume.

17. A method for controlling an information processing system according to claim 15, further comprising a selection step of selecting one of the initializing replication processing from the first logical volume to the third logical volume and the re-initializing replication processing from the first logical volume to the second logical volume to be executed first.

18. A method for controlling an information processing system according to claim 17, wherein the selection step includes the steps of comparing a time period required for the initializing replication processing from the first logical volume to the third logical volume with a time period required for the re-initializing replication processing from the first logical volume to the second logical volume, judging which one of the time periods is shorter, and executing the selection step based on a judgment result provided by the step of judging.

19. A method for controlling an information processing system according to claim 15, further comprising the step of starting the replication management processing from the first logical volume to the second logical volume after completing the re-initializing replication processing from the first logical volume to the second logical volume.

20. A method for controlling an information processing system according to claim 11, wherein, when the data cannot be written in the second logical volume during executing the replication management processing from the first logical volume to the second logical volume, the initializing replication processing from the first logical volume to the third logical volume is automatically started.

21. A method for controlling an information processing system according to claim 20, further comprising the step of automatically starting an initializing replication processing from the first logical volume to a fourth logical volume of a fourth storage apparatus, when the data cannot be written in the third logical volume during executing the initializing replication processing from the first logical volume to the third logical volume, wherein the first storage apparatus sends the data to the fourth storage apparatus, and the fourth storage apparatus stores the data in the fourth logical volume.

22. A method for controlling an information processing system according to claim 21, wherein the initializing replication processing from the first logical volume to the fourth logical volume is automatically started, when the data cannot be written in the third logical volume, the first storage apparatus queries the fourth storage apparatus about a usage status of the fourth logical volume, and the first storage apparatus receives a notification from the fourth storage apparatus indicating that the fourth logical volume is usable.

23. A method for controlling an information processing system according to claim 20, wherein the replication management processing from the first logical volume to the third logical volume starts after completing the initializing replication processing from the first logical volume to the third logical volume.

24. A method for controlling an information processing system according to claim 20, further comprising the steps of:
judging whether or not data can be written in the second logical volume during executing the initializing replication processing from the first logical volume to the third logical volume; and
starting a re-initializing replication processing, when a determination is made that data can be written in the second logical volume, wherein the first storage apparatus sends all data of the first logical volume to the second storage apparatus, and the second storage apparatus stores in the second logical volume all the data of the first logical volume.

25. A method for controlling an information processing system according to claim 24, wherein the step of judging whether or not data can be written in the second logical volume includes the step of judging whether or not data can be written twice consecutively in the second logical volume.

26. A method for controlling an information processing system according to claim 24, further comprising a selection step of selecting one of the initializing replication processing from the first logical volume to the third logical volume and the re-initializing replication processing from the first logical volume to the second logical volume to be executed first.

27. A method for controlling an information processing system according to claim 26, wherein the selection step includes the steps of comparing a time period required for the initializing replication processing from the first logical volume to the third logical volume with a time period required for the re-initializing replication processing from the first logical volume to the second logical volume, judging which one of the time periods is shorter, and executing the selection step based on a judgment result provided by the step of judging.

28. A method for controlling an information processing system according to claim 24, further comprising the step of starting the replication management processing from the first logical volume to the second logical volume after completing the re-initializing replication processing from the first logical volume to the second logical volume.

29. A method for controlling an information processing system according to claim 11, further comprising the step of automatically starting an initializing replication processing from the first logical volume to a fourth logical volume of a fourth storage apparatus, when the data cannot be written in the third logical volume during executing the initializing replication processing from the first logical volume to the third logical volume, wherein the first storage apparatus sends the data to the fourth storage apparatus, and the fourth storage apparatus stores the data in the fourth logical volume.

30. A method for controlling an information processing system essentially composed of a first storage apparatus equipped with a first logical volume, a second storage apparatus equipped with a second logical volume, a third storage apparatus equipped with a third logical volume, an information processing apparatus that accesses the first storage apparatus, a first communication module that communicatively connects the first storage apparatus with the second storage apparatus, and a second communication module that communicatively connects the first storage apparatus with the third storage apparatus, the method comprising the steps of:
executing a replication management processing from the first logical volume to the second logical volume, wherein, upon receiving a data write request from the information processing apparatus, the first storage apparatus stores data in the first logical volume according to the data write request and also sends the data to the second storage apparatus, and upon receiving the data, the second storage apparatus stores the data in the second logical volume;
executing a replication management processing from the first logical volume to the third logical volume, wherein, upon receiving a request to execute a failover from the information processing apparatus, the first storage apparatus sends the data to the third storage apparatus, and upon receiving the data, the third storage apparatus stores the data in the third logical volume;

executing an initializing replication processing from the first logical volume to the second logical volume, when a content of the first logical volume is not consistent with a content of the second logical volume;

executing an initializing replication processing from the first logical volume to the third logical volume, when a content of the first logical volume is not consistent with a content of the third logical volume;

judging whether or not data can be written in the second logical volume during executing the replication management processing from the first logical volume to the third logical volume; and starting a re-initializinq replication processing, when a determination is made that data can be written in the second logical volume, wherein the first storage apparatus sends all data of the first logical volume to the second storage apparatus, and the second storage apparatus stores in the second logical volume all the data of the first logical volume, wherein the step of judging whether or not data can be written in the second logical volume includes the step of judging whether or not data can be written twice consecutively in the second logical volume.

31. A method for controlling an information processing system essentially composed of a first storage apparatus equipped with a first logical volume, a second storage apparatus equipped with a second logical volume, a third storage apparatus equipped with a third logical volume, an information processing apparatus that accesses the first storage apparatus, a first communication module that communicatively connects the first storage apparatus with the second storage apparatus, and a second communication module that communicatively connects the first storage apparatus with the third storage apparatus, the method comprising the steps of:

executing a replication management processing from the first logical volume to the second logical volume, wherein, upon receiving a data write request from the information processing apparatus, the first storage apparatus stores data in the first logical volume according to the data write request and also sends the data to the second storage apparatus, and upon receiving the data, the second storage apparatus stores the data in the second logical volume;

executing a replication management processing from the first logical volume to the third logical volume, wherein, upon receiving a request to execute a failover from the information processing apparatus, the first storage apparatus sends the data to the third storage apparatus, and upon receiving the data, the third storage apparatus stores the data in the third logical volume;

executing an initializing replication processing from the first logical volume to the second logical volume, when a content of the first logical volume is not consistent with a content of the second logical volume;

executing an initializing replication processing from the first logical volume to the third logical volume, when a content of the first logical volume is not consistent with a content of the third logical volume;

judging whether or not data can be written in the second logical volume during executing the replication management processing from the first logical volume to the third logical volume; and starting a re-initializing replication processing, when a determination is made that data can be written in the second logical volume, wherein the first storage apparatus sends all data of the first logical volume to the second storage apparatus, and the second storage apparatus stores in the second logical volume all the data of the first logical volume; and starting the replication management processing from the first logical volume to the second logical volume after completing the re-initializing replication processing from the first logical volume to the second logical volume.

32. A method for controlling an information processing system essentially composed of a first storage apparatus equipped with a first logical volume, a second storage apparatus equipped with a second logical volume, a third storage apparatus equipped with a third logical volume, an information processing apparatus that accesses the first storage apparatus, a first communication module that communicatively connects the first storage apparatus with the second storage apparatus, and a second communication module that communicatively connects the first storage apparatus with the third storage apparatus; the method comprising the steps of:

executing a replication management processing from the first logical volume to the second logical volume, wherein, upon receiving a data write request from the information processing apparatus, the first storage apparatus stores data in the first logical volume according to the data write request and also sends the data to the second storage apparatus, and upon receiving the data, the second storage apparatus stores the data in the second logical volume;

executing a replication management processing from the first logical volume to the third logical volume, wherein, upon receiving a request to execute a failover from the information processing apparatus, the first storage apparatus sends the data to the third storage apparatus, and upon receiving the data, the third storage apparatus stores the data in the third logical volume;

executing an initializing replication processing from the first logical volume to the second logical volume, when a content of the first logical volume is not consistent with a content of the second logical volume;

executing an initializing replication Processing from the first logical volume to the third logical volume, when a content of the first logical volume is not consistent with a content of the third logical volume;

judging whether or not data can be written in the second logical volume during executing the replication management processing from the first logical volume to the third logical volume; and starting a re-initializing replication processing, when a determination is made that data can be written in the second logical volume, wherein the first storage apparatus sends all data of the first logical volume to the second storage apparatus, and the second storage apparatus stores in the second logical volume all the data of the first logical volume, wherein, when data cannot be written in the second logical volume during executing the re-initializing replication management processing from the first logical volume to the second logical volume, only the replication management processing from the first logical volume to the third logical volume is continued.

33. A method for controlling an information processing system essentially composed of a first storage apparatus equipped with a first logical volume, a second storage apparatus equipped with a second logical volume, a third storage apparatus equipped with a third logical volume, an information processing apparatus that accesses the first storage apparatus, a first communication module that communicatively connects the first storage apparatus with the second storage apparatus, and a second communication module that communicatively connects the first storage apparatus with the third storage apparatus, the method comprising the steps of:

executing a replication management processing from the first logical volume to the second logical volume, wherein, upon receiving a data write request from the information processing apparatus, the first storage apparatus stores data in the first logical volume according to the data write request and also sends the data to the second storage apparatus, and upon receiving the data, the second storage apparatus stores the data in the second logical volume;

executing a replication management processing from the first logical volume to the third logical volume, wherein, upon receiving a request to execute a failover from the information processing apparatus, the first storage apparatus sends the data to the third storage apparatus, and upon receiving the data, the third storage apparatus stores the data in the third logical volume;

executing an initializing replication processing from the first logical volume to the second logical volume, when a content of the first logical volume is not consistent with a content of the second logical volume;

executing an initializing replication processing from the first logical volume to the third logical volume, when a content of the first logical volume is not consistent with a content of the third logical volume;

judging whether or not data can be written in the second logical volume during executing the replication management processing from the first logical volume to the third logical volume; and starting a re-initializing replication processing, when a determination is made that data can be written in the second logical volume, wherein the first storage apparatus sends all data of the first logical volume to the second storage apparatus, and the second storage apparatus stores in the second logical volume all the data of the first logical volume, wherein, when data cannot be written in the third logical volume during executing the re-initializing replication management processing from the first logical volume to the second logical volume, the re-initializing replication management processing from the first logical volume to the second logical volume is continued.

34. A method for controlling an information processing system essentially composed of a first storage apparatus equipped with a first logical volume, a second storage apparatus equipped with a second logical volume, a third storage apparatus equipped with a third logical volume, an information processing apparatus that accesses the first storage apparatus, a first communication module that communicatively connects the first storage apparatus with the second storage apparatus, and a second communication module that communicatively connects the first storage apparatus with the third storage apparatus, the method comprising the steps of:

executing a replication management processing from the first logical volume to the second logical volume, wherein, upon receiving a data write request from the information processing apparatus, the first storage apparatus stores data in the first logical volume according to the data write request and also sends the data to the second storage apparatus, and upon receiving the data, the second storage apparatus stores the data in the second logical volume;

executing a replication management processing from the first logical volume to the third logical volume, wherein, upon receiving a request to execute a failover from the information processing apparatus, the first storage apparatus sends the data to the third storage apparatus, and upon receiving the data, the third storage apparatus stores the data in the third logical volume;

judging whether or not data can be written in the second logical volume during executing the replication management processing from the first logical volume to the third logical volume;

comparing a content of the first logical volume with a content of the second logical volume, when a determination is made that data can be written in the second logical volume; and starting a re-initializing replication processing from the first logical volume to the second logical volume, when a difference is detected between the content of the first logical volume and the second logical volume, wherein the first storage apparatus sends to the second storage apparatus data that is not present in the second logical volume, and the second storage apparatus stores in the second logical volume the data that is not present in the second logical volume.

35. A method for controlling an information processing system according to claim 34, wherein the step of judging whether or not data can be written in the second logical volume includes the step of judging whether or not data can be written twice consecutively in the second logical volume.

36. A method for controlling an information processing system according to claim 34, further comprising the step of starting the replication management processing from the first logical volume to the second logical volume after completing the re-initializing replication processing from the first logical volume to the second logical volume.

37. A method for controlling an information processing system according to claim 34, wherein, when data cannot be written in the second logical volume during executing the re-initializing replication management processing from the first logical volume to the second logical volume, only the replication management processing from the first logical volume to the third logical volume is continued.

38. A method for controlling an information processing system according to claim 34, wherein, when data cannot be written in the third logical volume during executing the re-initializing replication management processing from the first logical volume to the second logical volume, the re-initializing replication management processing from the first logical volume to the second logical volume is continued.

* * * * *